US011923712B2

(12) United States Patent
Li et al.

(10) Patent No.: US 11,923,712 B2
(45) Date of Patent: Mar. 5, 2024

(54) BATTERY CHARGING AND DISCHARGING CONTROLLER DEVICE

(71) Applicant: CONTEMPORARY AMPEREX TECHNOLOGY CO., LIMITED, Ningde (CN)

(72) Inventors: Zhanliang Li, Ningde (CN); Huanle Zhou, Ningde (CN); Meng Li, Ningde (CN); Xiyang Zuo, Ningde (CN); Yu Yan, Ningde (CN); Zhimin Dan, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/320,035

(22) Filed: May 18, 2023

(65) Prior Publication Data
US 2023/0291219 A1 Sep. 14, 2023

Related U.S. Application Data

(63) Continuation of application No. PCT/CN2021/117710, filed on Sep. 10, 2021.

(51) Int. Cl.
*H02J 7/00* (2006.01)
*H01M 10/04* (2006.01)
*H01M 10/44* (2006.01)

(52) U.S. Cl.
CPC ....... *H02J 7/0068* (2013.01); *H01M 10/0404* (2013.01); *H01M 10/446* (2013.01); *H02J 2207/20* (2020.01)

(58) Field of Classification Search
USPC ................................. 320/128, 140
See application file for complete search history.

(56) References Cited

U.S. PATENT DOCUMENTS

2011/0187309 A1  8/2011  Chan et al.
2015/0288212 A1*  10/2015  Kim ............. H02J 7/0029
                                    307/80
2017/0331311 A1*  11/2017  Kim ............. H02J 7/0068

FOREIGN PATENT DOCUMENTS

CN   105680534 A    6/2016
CN   206789649 U    12/2017
(Continued)

OTHER PUBLICATIONS

The World Intellectual Property Organization (WIPO) Written Opinion for PCT/CN2021/117710 dated Apr. 1, 2022 9 pages (including English translation).
(Continued)

Primary Examiner — Samuel Berhanu
(74) Attorney, Agent, or Firm — ANOVA LAW GROUP, PLLC

(57) ABSTRACT

A battery formation apparatus includes a DC-DC conversion module, an additional power supply, and a control circuit. Low-voltage and high-voltage terminals of the DC-DC conversion module are electrically connected to the control circuit and a DC bus, respectively. The DC-DC conversion module is configured to, when a battery unit discharges into the battery formation apparatus, convert a first voltage input into a second voltage greater than the first voltage, and output the second voltage. The additional power supply is electrically connected to the control circuit, and configured to output an additional voltage. The control circuit is electrically connected to the battery unit, the low-voltage terminal of the DC-DC conversion module, and the additional power supply. The control circuit is configured to serially connect the low-voltage terminal of the DC-DC conversion (Continued)

module, the battery unit, and the additional power supply when the battery unit discharges into the battery formation apparatus.

19 Claims, 12 Drawing Sheets

(56) References Cited

FOREIGN PATENT DOCUMENTS

| | | | |
|---|---|---|---|
| CN | 110015158 A | 7/2019 | |
| CN | 111769336 A | 10/2020 | |
| CN | 111799497 A | 10/2020 | |
| JP | H11289676 A | 10/1999 | |
| JP | 2002078229 A | 3/2002 | |
| JP | 2017531983 A | 10/2017 | |
| KR | 20140094857 A | 7/2014 | |

OTHER PUBLICATIONS

The World Intellectual Property Organization (WIPO) International Search Report for PCT/CN2021/117710 dated Apr. 1, 2022 5 pages (including English translation).
Korean Intellectual Property Office (KIPO) Notice of review opinion For KR Application No. 10-2023-7016654 dated Jul. 18, 2023 42 Pages (Translation Included ).
The Japan Patent Office (JPO) Patent evaluation for Application No. 2023-526410 Dec. 11, 2023 7 Pages (including translation).

* cited by examiner

BATTERY CHARGING AND DISCHARGING CONTROLLER DEVICE

CROSS-REFERENCE TO RELATED APPLICATION

This application is a continuation of International Application No. PCT/CN2021/117710, filed on Sep. 10, 2021, the entire content of which is incorporated herein by reference.

TECHNICAL FIELD

The present application relates to the field of batteries, and specifically to a battery formation apparatus, a control method for a battery formation apparatus, and a control system.

BACKGROUND ART

Battery formation is an important process of battery production. Battery formation is specifically charging and discharging a battery by using a battery formation apparatus, to improve battery performance and detect a battery capacity.

However, using an existing battery formation apparatus, a battery cannot sufficiently discharge, resulting in a lower battery formation effect and lower accuracy of a detected battery capacity.

SUMMARY

In view of the foregoing problems, the present application provides a battery formation apparatus, a control method for a battery formation apparatus, and a control system, to resolve the technical problems of a poor battery formation effect and low accuracy of a detected battery capacity that are caused when a battery cannot sufficiently discharge.

In a first aspect, the present application provides a battery formation apparatus. The apparatus includes: a first DC-DC conversion module, an additional power supply, and a control circuit. A low-voltage terminal of the first DC-DC conversion module is electrically connected to the control circuit. A high-voltage terminal of the first DC-DC conversion module is electrically connected to a DC bus. The first DC-DC conversion module is configured to: when a battery unit discharges into the battery formation apparatus, convert a first voltage input through the low-voltage terminal into a second voltage, and output the second voltage through the high-voltage terminal. The second voltage is greater than the first voltage. The additional power supply is electrically connected to the control circuit. The additional power supply is configured to output an additional voltage. A polarity of the additional power supply is consistent with a polarity of the battery unit. The control circuit is electrically connected to the battery unit, the low-voltage terminal of the first DC-DC conversion module, and the additional power supply. The control circuit is configured to serially connect the low-voltage terminal of the first DC-DC conversion module, the battery unit, and the additional power supply when the battery unit discharges into the battery formation apparatus.

In the technical solution of this embodiment of the present application, when the battery unit discharges into the battery formation apparatus, the control circuit serially connects the low-voltage terminal of the first DC-DC conversion module, the battery unit, and the additional power supply. In addition, the polarity of the battery unit is the same as the polarity of the additional power supply, so that polarities of voltages output by the battery unit and the additional power supply are consistent. The voltages output by the battery unit and the additional power supply are superposed and then input to the low-voltage terminal of the first DC-DC conversion module, thereby avoiding that an input voltage of the first DC-DC conversion module is less than a minimum input voltage threshold of the first DC-DC conversion module. Therefore, each battery cell of the battery unit can sufficiently discharge, thereby avoiding the technical defects of a poor formation effect of the battery unit and poor accuracy of a detected battery capacity that are caused when each battery cell of the battery unit cannot sufficiently discharge.

In some embodiments, the control circuit is further configured to serially connect the low-voltage terminal of the first DC-DC conversion module and the battery unit when the battery formation apparatus charges the battery unit. In this way, the additional power supply can avoid affecting the charging process when the battery formation apparatus charges the battery unit. In addition, the additional power supply may not output a voltage when the battery formation apparatus charges the battery unit, so that overall energy consumption of the battery formation apparatus can be reduced.

In some embodiments, the apparatus further includes: a detection module. The detection module is electrically connected to the battery unit and the control circuit. The detection module is configured to detect an output voltage of the battery unit. The control circuit is further configured to serially connect the low-voltage terminal of the first DC-DC conversion module, the battery unit, and the additional power supply when the battery unit discharges into the battery formation apparatus and the detection module detects that the output voltage of the battery unit is less than a first voltage threshold. In this way, the detection module detects the output voltage of the battery unit when the battery unit discharges. When the battery unit is in a discharge state and the output voltage of the battery unit is less than the first voltage threshold, the additional power supply is turned on. The additional power supply is serially connected to a discharge circuit formed with the low-voltage terminal of the first DC-DC conversion module and the battery unit, thereby further reducing overall energy consumption of the battery formation apparatus and reducing formation processing costs of the battery formation apparatus.

In some embodiments, the battery unit is single. Formation processing is performed on the single battery unit by using one charge and discharge assembly, thereby avoiding that a formation process of another battery unit interferes with a formation process of this battery unit and helping improve detection accuracy of a capacity of the battery unit.

In some embodiments, the control circuit includes a first control switch and a second control switch. A first subterminal of the low-voltage terminal of the first DC-DC conversion module is electrically connected to a first electrode of the battery unit. A first terminal of the first control switch is electrically connected to a second subterminal of the low-voltage terminal of the first DC-DC conversion module and a second electrode of the additional power supply. A second terminal of the first control switch is electrically connected to a second electrode of the battery unit and a second terminal of the second control switch. A first terminal of the second control switch is electrically connected to a first electrode of the additional power supply. When the battery unit discharges into the battery formation apparatus, the first terminal of the first control switch is not connected to the second terminal of the first control switch, and the first terminal of the second control switch is connected to the second terminal of the second control switch. In this way, the charge and discharge assembly corresponds to the single battery unit, and the first control switch and the second control switch control connection of the additional power supply to a charge and discharge circuit, thereby further simplifying a structure of the battery formation apparatus and reducing formation costs.

In some embodiments, the control circuit includes a first control switch and a second control switch. A first subterminal of the low-voltage terminal of the first DC-DC conversion module is electrically connected to a first electrode of the battery unit. A first terminal of the first control switch is electrically connected to a second subterminal of the low-voltage terminal of the first DC-DC conversion module and a first terminal of the second control switch. A second terminal of the first control switch is electrically connected to a second electrode of the battery unit and a first electrode of the additional power supply. A second terminal of the second control switch is electrically connected to a second electrode of the additional power supply. When the battery unit discharges into the battery formation apparatus, the first terminal of the first control switch is not connected to the second terminal of the first control switch, and the first terminal of the second control switch is connected to the second terminal of the second control switch. In this way, the charge and discharge assembly corresponds to the single battery unit, and the first control switch and the second control switch control connection of the additional power supply to a charge and discharge circuit, thereby further simplifying a structure of the battery formation apparatus and reducing formation costs.

In some embodiments, the control circuit includes a third control switch. A first subterminal of the low-voltage terminal of the first DC-DC conversion module is electrically connected to a first electrode of the battery unit. A first terminal of the third control switch is electrically connected to a second subterminal of the low-voltage terminal of the first DC-DC conversion module. A second terminal of the third control switch is electrically connected to a second electrode of the battery unit and a first electrode of the additional power supply. A third terminal of the third control switch is electrically connected to a second electrode of the additional power supply. When the battery unit discharges into the battery formation apparatus, the first terminal of the third control switch is not connected to the second terminal of the third control switch, and the first terminal of the third control switch is connected to the third terminal of the third control switch. In this way, the charge and discharge assembly corresponds to the single battery unit, and the third control switch may control connection of the additional power supply to a charge and discharge circuit, thereby further simplifying a structure of the battery formation apparatus, reducing a quantity of elements of the battery formation apparatus, and reducing formation costs.

In some embodiments, the battery unit includes a first battery unit and a second battery unit. Formation processing is performed on a plurality of battery units by using one charge and discharge assembly, to effectively improve usage of the charge and discharge assembly and reduce energy consumption and costs of the battery formation apparatus.

In some embodiments, the control circuit includes a first control switch and a second control switch. A first subterminal of the low-voltage terminal of the first DC-DC conversion module is electrically connected to a first electrode of the first battery unit. A second subterminal of the low-voltage terminal of the first DC-DC conversion module is electrically connected to a second electrode of the second battery unit. A first terminal of the first control switch is electrically connected to a second electrode of the first battery unit and a first electrode of the additional power supply. A second terminal of the first control switch is electrically connected to a first electrode of the second battery unit and a second terminal of the second control switch. A first terminal of the second control switch is electrically connected to a second electrode of the additional power supply. When the battery unit discharges into the battery formation apparatus, the first terminal of the first control switch is not connected to the second terminal of the first control switch, and the first terminal of the second control switch is connected to the second terminal of the second control switch. In this way, the charge and discharge assembly corresponds to the first battery unit and the second battery unit, and the first control switch and the second control switch control connection of the additional power supply to a charge and discharge circuit, thereby simplifying a structure of the battery formation apparatus and reducing formation costs. In addition, the first control switch and the second control switch are disposed between the two battery units, thereby effectively shortening a connection wire and reducing costs of the battery formation apparatus.

In some embodiments, the control circuit includes a first control switch and a second control switch. A first subterminal of the low-voltage terminal of the first DC-DC conversion module is electrically connected to a first electrode of the first battery unit. A second subterminal of the low-voltage terminal of the first DC-DC conversion module is electrically connected to a second electrode of the second battery unit. A first terminal of the first control switch is electrically connected to a second electrode of the first battery unit and a first terminal of the second control switch. A second terminal of the first control switch is electrically connected to a second electrode of the additional power supply and a first electrode of the second battery unit. A second terminal of the second control switch is electrically connected to a first electrode of the additional power supply. When the battery unit discharges into the battery formation apparatus, the first terminal of the first control switch is not connected to the second terminal of the first control switch, and the first terminal of the second control switch is connected to the second terminal of the second control switch. In this way, the charge and discharge assembly corresponds to the first battery unit and the second battery unit, and the first control switch and the second control switch control connection of the additional power supply to a charge and discharge circuit, thereby simplifying a structure of the battery formation apparatus and reducing formation costs. In addition, the first control switch and the second control switch are disposed between the two battery units, thereby effectively shortening a connection wire and reducing costs of the battery formation apparatus.

In some embodiments, the control circuit includes a third control switch. A first subterminal of the low-voltage terminal of the first DC-DC conversion module is electrically connected to a first electrode of the first battery unit. A second subterminal of the low-voltage terminal of the first DC-DC conversion module is electrically connected to a second electrode of the second battery unit. A first terminal of the third control switch is electrically connected to a second electrode of the first battery unit. A second terminal of the third control switch is electrically connected to a first electrode of the additional power supply. A third terminal of the third control switch is electrically connected to a first electrode of the second battery unit. When the battery unit discharges into the battery formation apparatus, the first terminal of the third control switch is connected to the second terminal of the third control switch. In this way, the charge and discharge assembly corresponds to the first battery unit and the second battery unit, and one control switch controls connection of the additional power supply to a charge and discharge circuit, thereby further reducing a quantity of elements of the battery formation apparatus and reducing formation costs. In addition, the third control switch is disposed between the two battery units, thereby effectively shortening a connection wire and reducing costs of the battery formation apparatus.

In some embodiments, the additional power supply is a second DC-DC conversion module. A high-voltage terminal of the second DC-DC conversion module is electrically connected to the DC bus. A low-voltage terminal of the second DC-DC conversion module is serially connected to the low-voltage terminal of the first DC-DC conversion module and the battery unit when the battery unit discharges into the battery formation apparatus. In this way, the second DC-DC conversion module is used as the additional power supply. Therefore, when the battery unit discharges into the battery formation apparatus, a voltage output through the low-voltage terminal of the second DC-DC conversion module and a voltage output by the battery unit can be superposed and then input to the low-voltage terminal of the first DC-DC conversion module, thereby increasing an input voltage of the first DC-DC conversion module and avoiding the defect that the input voltage of the first DC-DC conversion module is less than a minimum input voltage threshold of the first DC-DC conversion module. In addition, the second DC-DC conversion module has low power consumption and a small size, thereby reducing energy consumption of the battery formation apparatus and reducing a size of the battery formation apparatus.

In some embodiments, the apparatus further includes: an AC-DC conversion module. An AC terminal of the AC-DC conversion module is electrically connected to the grid. A DC terminal of the AC-DC conversion module is electrically connected to the DC bus. The AC-DC conversion module is configured to: when the battery unit discharges into the battery formation apparatus, convert a DC voltage input through the DC terminal of the AC-DC conversion module into an AC voltage, and output the AC voltage through the AC terminal of the AC-DC conversion module. The AC-DC conversion module is configured to: when the battery formation apparatus charges the battery unit, convert an AC voltage input through the AC terminal of the AC-DC conversion module into a DC voltage, and output the DC voltage through the DC terminal of the AC-DC conversion module. In this way, the AC-DC conversion module is disposed in the battery formation apparatus, so that an AC current of the grid can be converted into a DC current to charge the battery unit. A DC current output by the battery unit can also be converted into an AC current to be output to the grid. Therefore, the battery formation apparatus can be applicable to an AC current scenario, and a use range of the battery formation apparatus is enlarged.

According to a second aspect, the present application provides a control method for a battery formation apparatus, including: receiving a discharge control instruction of a battery unit; controlling a low-voltage terminal of a first DC-DC conversion module, the battery unit, and an additional power supply in a battery formation apparatus to be serially connected; and controlling the battery unit to discharge into the battery formation apparatus.

In the technical solution of this embodiment of the present application, in a timely response to the discharge control instruction issued by an intermediary computer, the battery formation apparatus can serially connect the additional power supply to a discharge circuit formed with the low-voltage terminal of the first DC-DC conversion module and the battery unit, thereby increasing a voltage input to the first DC-DC conversion module and avoiding that the input voltage of the first DC-DC conversion module is less than a minimum input voltage threshold of the first DC-DC conversion module. Therefore, each battery cell of the battery unit can sufficiently discharge, thereby avoiding the technical defects of a poor formation effect of the battery unit and poor accuracy of a detected battery capacity that are caused when each battery cell of the battery unit cannot sufficiently discharge.

In some embodiments, the controlling a low-voltage terminal of a first DC-DC conversion module, the battery unit, and an additional power supply in a battery formation apparatus to be serially connected further includes: detecting an output voltage of the battery unit; and controlling the low-voltage terminal of the first DC-DC conversion module, the battery unit, and the additional power supply in the battery formation apparatus to be serially connected if it is detected that the output voltage of the battery unit is less than a first voltage threshold. In this way, when the battery unit is in a discharge state and the output voltage of the battery unit is less than the first voltage threshold, the additional power supply is turned on. The additional power supply is serially connected to the discharge circuit formed with the low-voltage terminal of the first DC-DC conversion module and the battery unit, thereby further reducing overall energy consumption of the battery formation apparatus and reducing formation processing costs of the battery formation apparatus.

In some embodiments, the controlling the low-voltage terminal of the first DC-DC conversion module, the battery unit, and the additional power supply in the battery formation apparatus to be serially connected if it is detected that the output voltage of the battery unit is less than a first voltage threshold further includes: if it is detected that the output voltage of the battery unit is less than the first voltage threshold, after stopping an AC-DC conversion module in the battery formation apparatus, controlling the low-voltage terminal of the first DC-DC conversion module, the battery unit, and the additional power supply in the battery formation apparatus to be serially connected; and after controlling the low-voltage terminal of the first DC-DC conversion module, the battery unit, and the additional power supply in the battery formation apparatus to be serially connected, restarting the AC-DC conversion module. In this way, the AC-DC conversion module is first stopped, to avoid that the AC-DC conversion module continuously outputs a high voltage to the first DC-DC conversion module through a DC bus. Then, the additional power supply is serially connected to the discharge circuit formed with the low-voltage terminal of the first DC-DC conversion module and the battery unit, thereby avoiding a transient peak voltage in the first DC-DC conversion module and prolonging a service life of the first DC-DC conversion module.

In some embodiments, the method further includes: collecting battery state information of the battery unit, and feeding the battery state information back to the intermediary computer. In the implementations of this embodiment, the battery state information of the battery unit is collected in real time and fed back, so that a state of the battery unit during formation is learned of in a timely manner, an abnormal state is learned of in a timely manner, and a timely response is made to the abnormal state.

In some embodiments, the method further includes: determining whether charging duration for which the battery formation apparatus charges the battery unit exceeds preset duration; if the charging duration exceeds the preset duration, sending alarm information to the intermediary computer; and receiving a stop instruction sent by the intermediary computer based on the alarm information, and stopping the AC-DC conversion module in the battery formation apparatus. In this way, whether an anomaly exists in the battery unit is determined based on the charging duration of the battery unit. If it is determined that an anomaly exists in the battery unit, the alarm information is sent to the intermediary computer in a timely manner, so that the anomaly of the battery unit is handled with. In addition, during processing, an output of the AC-DC conversion module is stopped, thereby protecting safety of the battery unit and the battery formation apparatus and also reducing energy consumption of the battery formation apparatus and reducing formation costs.

In some embodiments, the method further includes: determining whether an output voltage of the battery unit exceeds a second voltage threshold; if the output voltage of the battery unit exceeds the second voltage threshold, sending alarm information to the intermediary computer; and receiving a stop instruction sent by the intermediary computer based on the alarm information, and stopping an output of the battery unit according to the stop instruction. In this way, whether an anomaly exists is determined based on a discharge voltage of the battery unit. If it is determined that an anomaly exists, the alarm information is sent to the intermediary computer in a timely manner, so that the anomaly is handled with. In addition, during processing, an output of the battery unit is stopped, thereby protecting safety of the battery unit and the battery formation apparatus and also reducing energy consumption of the battery unit and reducing formation costs.

According to a third aspect, the present application provides a battery formation control system, including: the foregoing battery formation apparatus and an intermediary computer. The intermediary computer is communicatively connected to the battery formation apparatus. The intermediary computer is configured to send a charge control instruction or a discharge control instruction to the battery formation apparatus. The battery formation apparatus is configured to control, according to the discharge control instruction, a battery unit to discharge into the battery formation apparatus; or the battery formation apparatus is configured to control, according to the charge control instruction, the battery formation apparatus to charge a battery unit.

The above description is only an overview of the technical solutions of the present application. In order to more clearly understand the technical means of the present application to implement same according to the contents of the description, and in order to make the above and other objectives, features and advantages of the present application more obvious and understandable, specific implementations of the present application are exemplarily described below.

BRIEF DESCRIPTION OF THE DRAWINGS

Various other advantages and benefits will become apparent to those of ordinary skill in the art upon reading the following detailed description of some implementations. Accompanying drawings are merely for the purpose of illustrating the some implementations and are not to be construed as limiting the present application. Moreover, like components are denoted by like reference numerals throughout the accompanying drawings. In the drawings.

REFERENCE NUMERALS IN THE SPECIFIC IMPLEMENTATIONS

Figure 1:
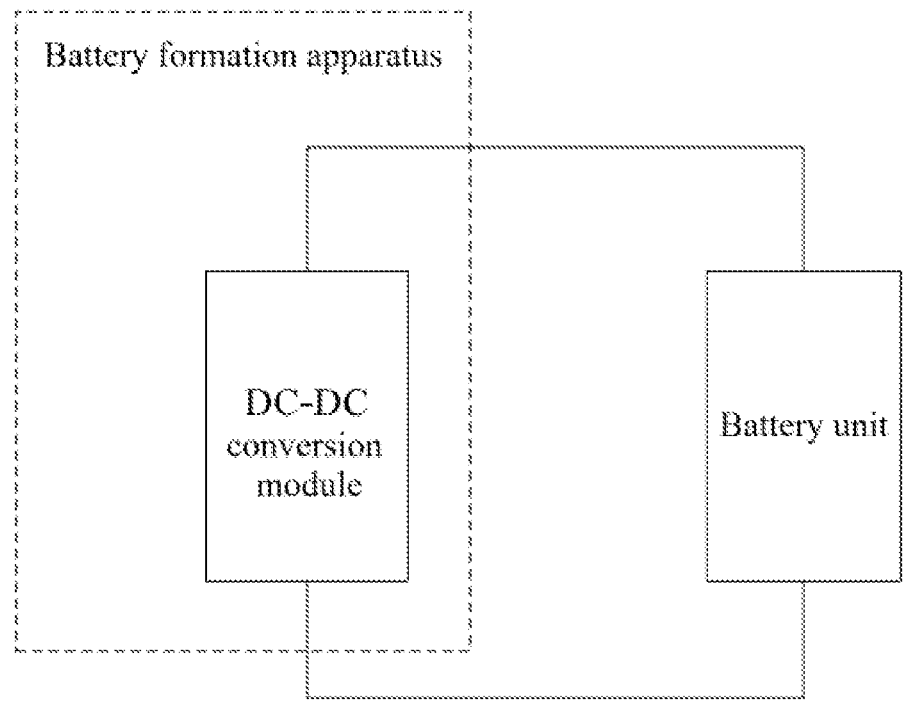
FIG. 1 is a schematic structural diagram of a battery formation apparatus.

Battery formation apparatus 100, battery unit 200, intermediary computer 300, battery formation control system 400;

First DC-DC conversion module 110, additional power supply 120, control circuit 130, DC bus 140, detection module 150, AC-DC conversion module 160;

Low-voltage terminal 111 of the first DC-DC conversion module, high-voltage terminal 112 of the first DC-DC conversion module;

AC terminal 161 of the AC-DC conversion module, DC terminal 162 of the AC-DC conversion module;

First battery unit 210, second battery unit 220;

First control switch 131, second control switch 132, third control switch 133.

DETAILED DESCRIPTION OF EMBODIMENTS

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: the three instances of A alone, A and B simultaneously, and B alone. In addition, the character "/" herein generally indicates an "or" relationship between the associated objects. In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front"; "rear", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are merely intended to facilitate and simplify the description of the embodiments of the present application, rather than indicating or implying that the apparatus or element considered must have a particular orientation or be constructed and operated in a particular orientation, and therefore not to be construed as limiting the embodiments of the present application.

In the description of the embodiments of the present application, unless otherwise explicitly specified and defined, the technical terms such as "install", "couple", "connect", and "fix" should be understood in a broad sense, for example, they may be a fixed connection, a detachable connection, or an integrated connection; may be a mechanical connection or an electric connection; and may be a direct connection or an indirect connection by means of an intermediate medium, or may be communication between interiors of two elements or interaction between the two elements. For those of ordinary skill in the art, the specific meanings of the above terms in the embodiments of the present application can be understood according to specific situations.

Currently, with the continuous development of science and technology and society, a traction battery is widely used in electric transportations such as electric vehicles, clean energy and other energy storage power systems, and other fields. After being prepared and formed, the traction battery needs to be charged and discharged through a battery formation apparatus. This process is referred to as a formation process of the traction battery. The formation process of the traction battery can activate the traction battery and improve overall performance of the traction battery. In addition, a capacity of the traction battery can be detected in the formation process, to provide a basis for evaluation of performance of the traction battery.

Referring to FIG. 1, a battery formation apparatus in a conventional technology includes a DC-DC conversion module. The DC-DC conversion module is serially connected to a battery unit. When the battery unit is in a charge mode, the DC-DC conversion module decreases a voltage from the grid (power grid), and transmits to the battery unit to charge the battery unit. When the battery unit is in a discharge mode, the DC-DC conversion module increases an output voltage of the battery unit, and outputs to the grid.

During implementation, an inventor noticed that when the battery unit is in a discharge mode, namely, when the battery unit discharges into the battery formation apparatus, some battery cells have sufficiently discharged while some other battery cells still have power. In this case, the output voltage of the entire battery unit is low. However, the DC-DC conversion module has a corresponding input voltage amplitude limit. When the output voltage of the battery unit is less than a minimum input voltage threshold of the DC-DC conversion module, the output voltage of the battery unit cannot be transmitted to the grid through the DC-DC conversion module. As a result, some battery cells of the battery unit cannot sufficiently discharge, resulting in a lower formation effect of the battery unit and lower detection accuracy of a capacity of the battery unit.

To resolve the technical problems of a poor battery formation effect and low accuracy of a detected battery capacity that are caused when the battery unit cannot sufficiently discharge into the battery formation apparatus, the inventor performs deep research to design a battery formation apparatus. When the battery unit discharges into the DC-DC conversion module, an additional power supply that has a same polarity as the battery unit is serially connected to a circuit formed with the DC-DC conversion module and the battery unit, to increase the input voltage of the DC-DC conversion module. Using the battery formation apparatus of this structure, the battery cells of the battery unit can sufficiently discharge, thereby improving a battery formation effect and improving accuracy of a detected battery capacity.

The battery formation apparatus disclosed in the embodiments of the present application may be used in, but are not limited to, a formation process of storage batteries such as lithium-ion batteries, lead-acid batteries, and nickel metal hydride batteries. The storage battery is also referred to as a rechargeable battery, a secondary battery, or the like. The battery described in the embodiments of the present application specifically refers to the storage battery.

The battery unit described in the embodiments of the present application refers to a single physical module including one or more battery cells to provide a higher voltage and capacity. Quantities of battery cells included in different battery units may be the same or different. When the battery unit includes a plurality of battery cells, the plurality of battery cells included in the battery unit may be connected in parallel or in series. In an optional battery cell structure, the battery cell includes a positive electrode plate, a negative electrode plate, an electrolyte, and a separator.

The DC-DC conversion module described in the embodiments of the present application refers to a DC-DC converter. The DC-DC conversion module is configured to convert electric energy of a voltage value into electric energy of another voltage value. The DC-DC conversion module in the embodiments of the present application includes a high-voltage terminal and a low-voltage terminal. The high-voltage terminal is used to input or output electric energy greater than electric energy of the low-voltage terminal. The low-voltage terminal is used to input or output electric energy less than electric energy of the high-voltage terminal.

For a better understanding of the present application, the following describes in detail the embodiments of the present application with reference to FIG. 1 to FIG. 18.

Figure 2:
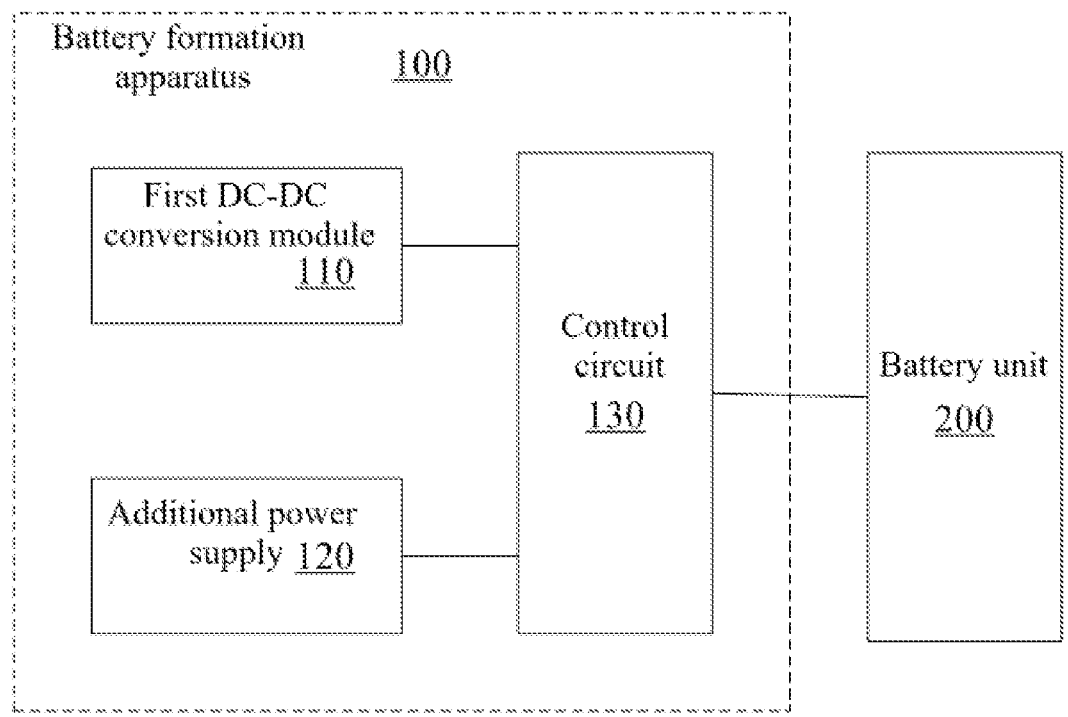
FIG. 2 is a schematic structural diagram of a battery formation apparatus according to some embodiments of the present application.
Figure 3:
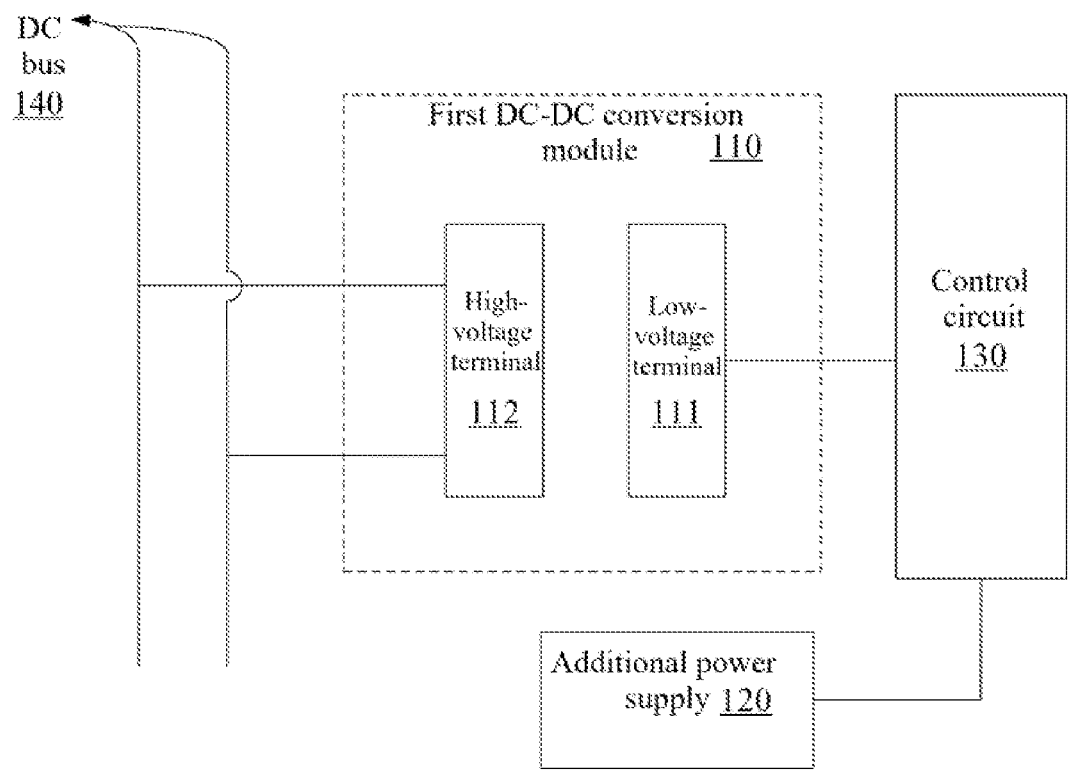
FIG. 3 is a schematic structural diagram of a first DC-DC conversion module according to some embodiments of the present application.
Figure 4:
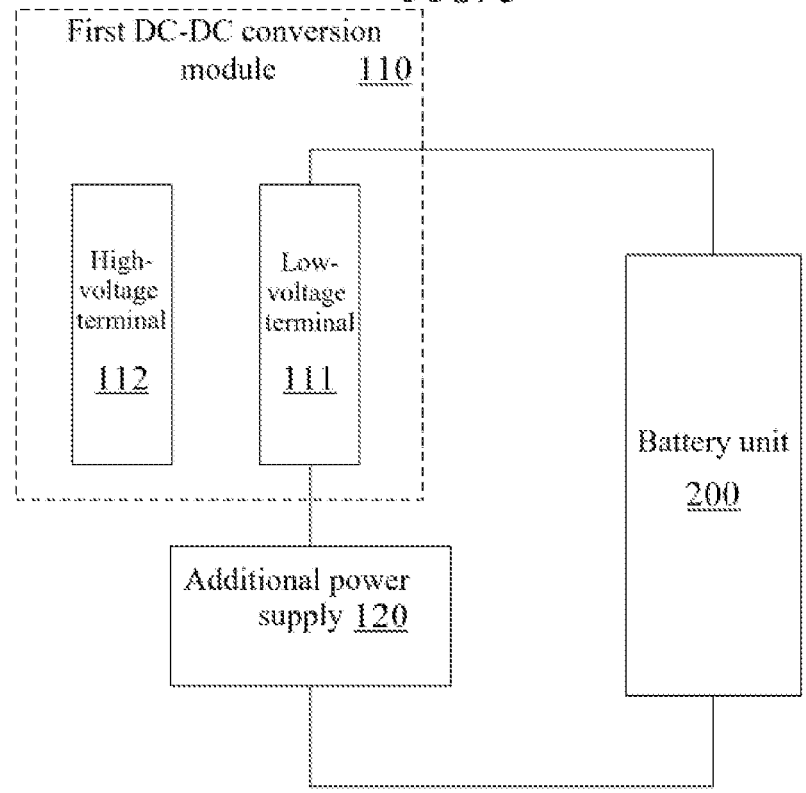
FIG. 4 is a schematic diagram of an equivalent circuit when a battery unit discharges into a battery formation apparatus according to some embodiments of the present application.

According to some embodiments of the present application, reference is made to FIG. 2, FIG. 3, and FIG. 4. FIG. 2 is a schematic structural diagram of a battery formation apparatus according to some embodiments of the present application. FIG. 3 is a schematic structural diagram of a first DC-DC conversion module according to some embodiments of the present application. FIG. 4 is a schematic diagram of an equivalent circuit when a battery unit discharges into a battery formation apparatus according to some embodiments of the present application.

As shown in FIG. 2, a battery formation apparatus 100 includes: a first DC-DC conversion module 110, an additional power supply 120, and a control circuit 130. The first DC-DC conversion module 110, the additional power supply 120, and a battery unit 200 are electrically connected to the control circuit 130. The control circuit 130 serially connects the first DC-DC conversion module 110, the battery unit 200, and the additional power supply 120 when the battery unit 200 discharges into the battery formation apparatus 100.

Further referring to FIG. 3, the first DC-DC conversion module 110 includes a low-voltage terminal 111 and a high-voltage terminal 112. The low-voltage terminal 111 is electrically connected to the control circuit 130. The high-voltage terminal 112 is electrically connected to a DC bus 140. The first DC-DC conversion module 110 is configured to: when the battery unit 200 discharges into the battery formation apparatus 100, convert a first voltage input through the low-voltage terminal 111 into a second voltage, and output the second voltage through the high-voltage terminal 112. The second voltage is greater than the first voltage. Therefore, when the battery unit 200 discharges into the battery formation apparatus 100, the first DC-DC conversion module 110 increases the input voltage, and then outputs to the DC bus 140. Optionally correspondingly, the first DC-DC conversion module 110 is further configured to: when the battery formation apparatus 100 charges the battery unit 200, decrease a voltage input to the high-voltage terminal 112 through the DC bus 140, and output through the low-voltage terminal 111.

In an optional implementation, the first DC-DC conversion module 110 is specifically an isolated type DC-DC converter. In this structure, an input circuit and an output circuit of the first DC-DC conversion module 110 are isolated from each other without interference, thereby simplifying a structure of the battery formation apparatus and reducing a size and costs of the battery formation apparatus.

With reference to FIG. 2 and FIG. 3, the additional power supply 120 is electrically connected to the control circuit 130. The additional power supply 120 is further configured to output an additional voltage. A polarity of the additional power supply 120 is consistent with a polarity of the battery unit 200.

The control circuit 130 is specifically configured to serially connect the low-voltage terminal 111 of the first DC-DC conversion module, the battery unit 200, and the additional power supply 120 when the battery unit 200 discharges into the battery formation apparatus 100. FIG. 4 is a schematic diagram of an equivalent circuit when a battery unit discharges into a battery formation apparatus according to some embodiments of the present application. As shown in FIG. 4, when the battery unit 200 discharges into the battery formation apparatus 100, the low-voltage terminal 111 of the first DC-DC conversion module, the battery unit 200, and the additional power supply 120 are serially connected. In addition, the polarity of the additional power supply 120 is consistent with the polarity of the battery unit 200, polarities of voltages output by the additional power supply 120 and the battery unit 200 are consistent, and a superposed amplitude of the voltages output by the additional power supply 120 and the battery unit 200 is equal to a sum of an amplitude of a voltage output by the additional power supply 120 and an amplitude of a voltage output by the battery unit 200, so that an amplitude of an input voltage of the first DC-DC conversion module is increased.

In this embodiment, when the battery unit discharges into the battery formation apparatus, the control circuit serially connects the low-voltage terminal of the first DC-DC conversion module, the battery unit, and the additional power supply. In addition, the polarity of the battery unit is the same as the polarity of the additional power supply, so that the polarities of the voltages output by the battery unit and the additional power supply are the same, and the input voltage of the first DC-DC conversion module is increased, thereby avoiding that the input voltage of the first DC-DC conversion module is less than a minimum input voltage threshold of the first DC-DC conversion module. Therefore, each battery cell of the battery unit can sufficiently discharge, thereby avoiding the technical defects of a poor formation effect of the battery unit and poor accuracy of a detected battery capacity that are caused when each battery cell of the battery unit cannot sufficiently discharge.

Figure 5:
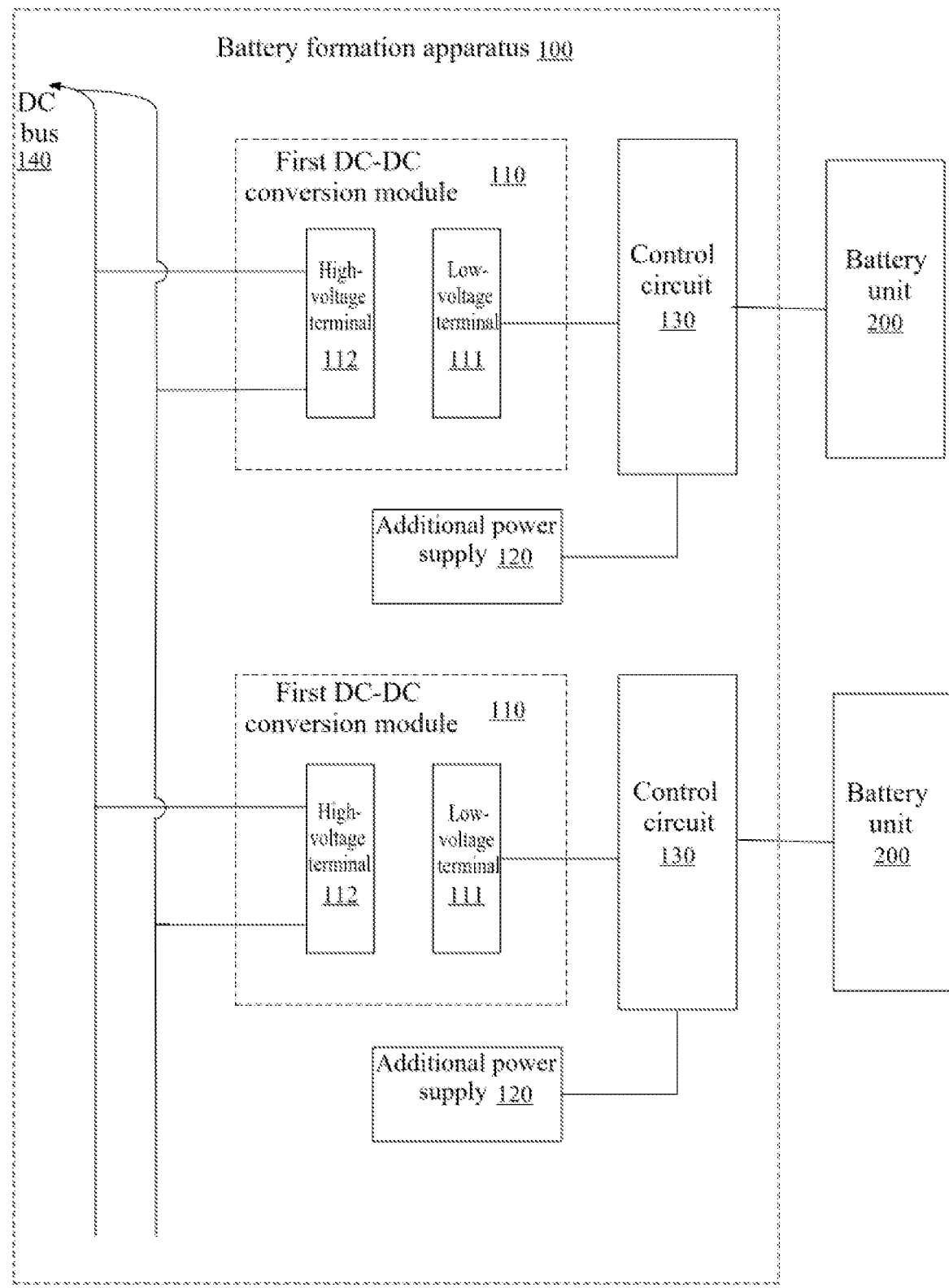
FIG. 5 is a schematic structural diagram of a battery formation apparatus according to some embodiments of the present application.

In some embodiments, optionally, FIG. 5 is a schematic structural diagram of a battery formation apparatus according to some embodiments of the present application. As shown in FIG. 5, one first DC-DC conversion module 110, one additional power supply 120, and one control circuit 130 form a charge and discharge assembly. Each charge and discharge assembly is configured to perform formation processing on the corresponding battery unit 200. Specifically, the high-voltage terminal 112 of the first DC-DC conversion module 110 in each charge and discharge assembly is electrically connected to the DC bus. In this structure, formation processing can be simultaneously performed on a plurality of battery units, thereby improving formation processing efficiency.

In some embodiments, optionally, the control circuit 130 is further configured to serially connect the low-voltage terminal 111 of the first DC-DC conversion module 110 and the battery unit 200 when the battery formation apparatus 100 charges the battery unit 200.

Figure 6:
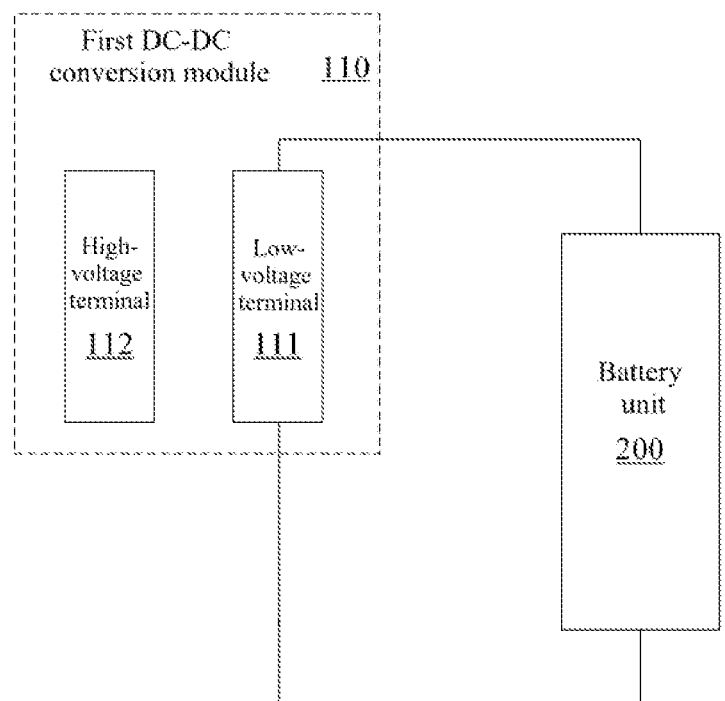
FIG. 6 is a schematic diagram of an equivalent circuit when a battery formation apparatus charges a battery unit according to some embodiments of the present application.

FIG. 6 is a schematic diagram of an equivalent circuit when a battery formation apparatus charges a battery unit according to some embodiments of the present application. As shown in FIG. 6, when the battery formation apparatus 100 charges the battery unit 200, the additional power supply 120 is not included in a charge circuit.

In the implementations of this embodiment, the additional power supply can avoid affecting the charging process when the battery formation apparatus charges the battery unit. In addition, the additional power supply may not output a voltage when the battery formation apparatus charges the battery unit, so that overall energy consumption of the battery formation apparatus can be reduced.

In some embodiments, optionally, the battery formation apparatus 100 further includes a detection module 150. The detection module 150 is electrically connected to the battery unit 200 and the control circuit 130.

Figure 7:
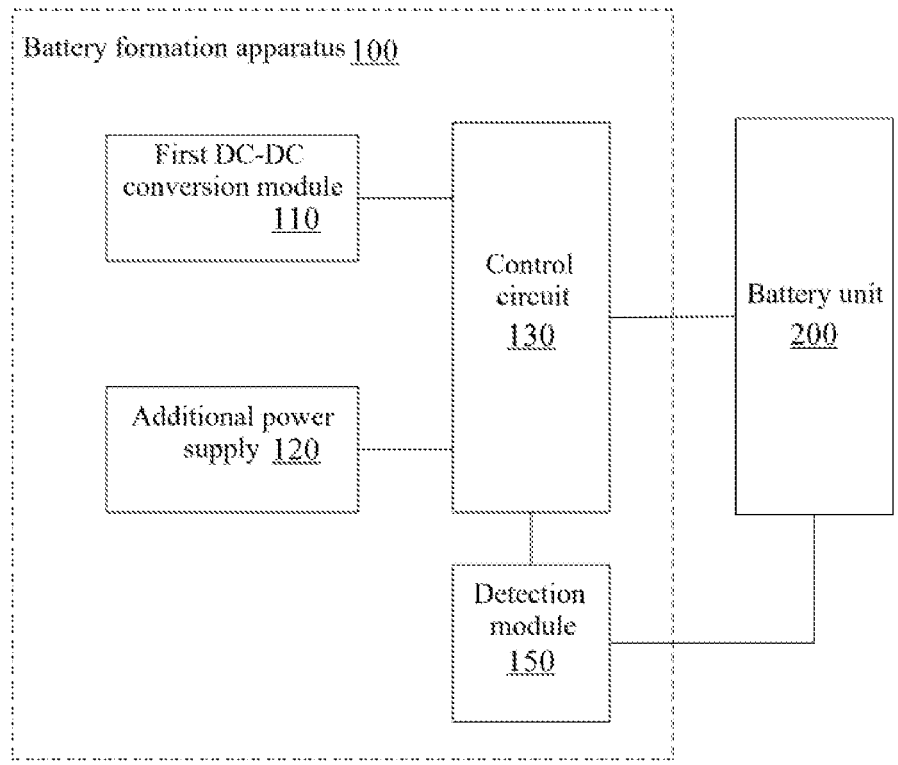
FIG. 7 is a schematic structural diagram of a battery formation apparatus according to some embodiments of the present application.

FIG. 7 is a schematic structural diagram of a battery formation apparatus according to some embodiments of the present application. As shown in FIG. 7, the detection module 150 is electrically connected to the battery unit 200 and the control circuit 130. When the battery unit 200 discharges into the battery formation apparatus 100, the detection module 150 is electrically connected to the battery unit 200, to detect the output voltage of the battery unit 200. In addition, the control circuit 130 is further configured to serially connect the low-voltage terminal of the first DC-DC conversion module, the battery unit, and the additional power supply when the battery unit 200 discharges into the battery formation apparatus 100 and the detection module 150 detects that the output voltage of the battery unit is less than a first voltage threshold. Correspondingly, the control circuit 130 serially connects only the low-voltage terminal 111 of the first DC-DC conversion module and the battery unit 200 when the battery formation apparatus 100 charges the battery unit 200 or the battery unit 200 discharges into the battery formation apparatus 100 and the detection module 150 detects that the output voltage of the battery unit is greater than or equal to the first voltage threshold.

In the implementations of this embodiment, the detection module detects the output voltage of the battery unit when the battery unit discharges. Only when the battery unit is in a discharge state and the output voltage of the battery unit is less than the first voltage threshold, the additional power supply is turned on. The additional power supply is serially connected to a discharge circuit formed with the low-voltage terminal of the first DC-DC conversion module and the battery unit, thereby further reducing overall energy consumption of the battery formation apparatus and reducing formation processing costs of the battery formation apparatus.

In some embodiments, optionally, one first DC-DC conversion module, one additional power supply, and one control circuit form a charge and discharge assembly. One charge and discharge assembly corresponds to a single battery unit. The battery unit includes one or more battery cells. Formation processing is performed on the single battery unit by using one charge and discharge assembly, thereby avoiding that a formation process of another battery unit interferes with a formation process of this battery unit and helping improve detection accuracy of a capacity of the battery unit.

In some embodiments, optionally, one charge and discharge assembly corresponds to a single battery unit. In addition, the control circuit 130 includes a first control switch 131 and a second control switch 132.

Figure 8:
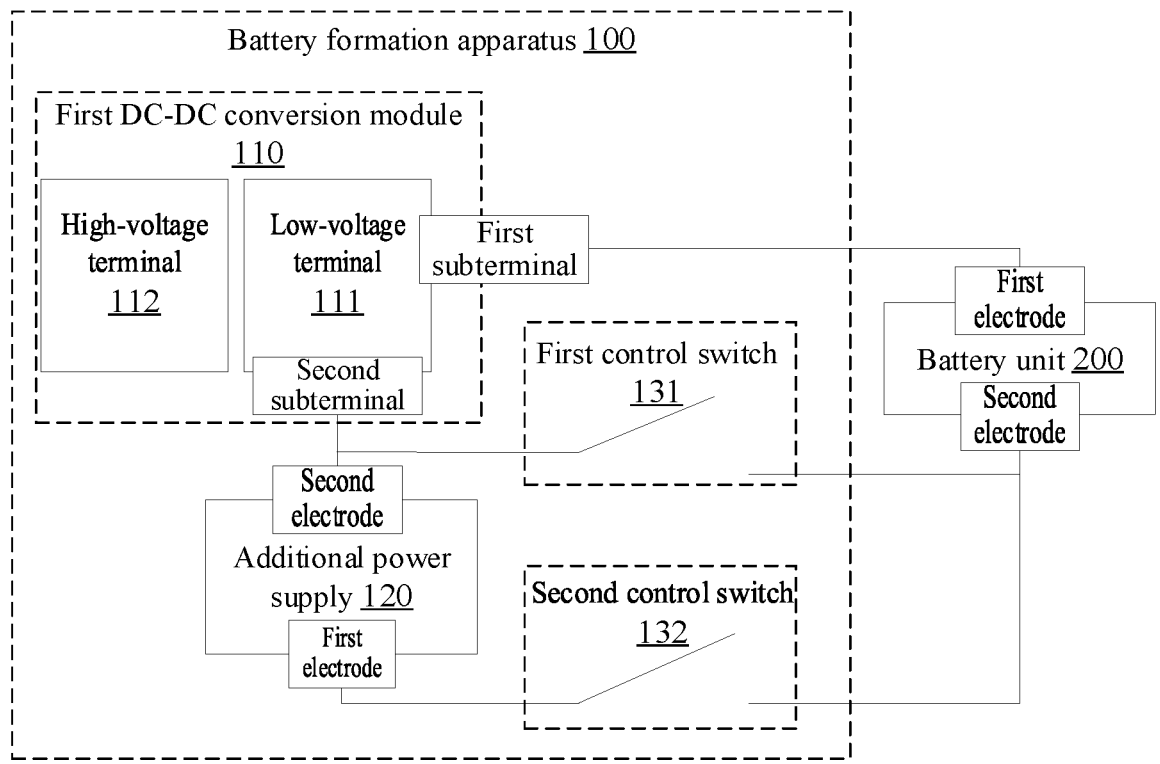
FIG. 8 is a schematic structural diagram of a battery formation apparatus according to some embodiments of the present application.

FIG. 8 is a schematic structural diagram of a battery formation apparatus according to some embodiments of the present application. As shown in FIG. 8, a first subterminal of the low-voltage terminal 111 of the first DC-DC conversion module 110 is electrically connected to a first electrode of the battery unit 200. A first terminal of the first control switch 131 is electrically connected to a second subterminal of the low-voltage terminal 111 of the first DC-DC conversion module 110 and a second electrode of the additional power supply. A second terminal of the first control switch 131 is electrically connected to a second electrode of the battery unit 200 and a second terminal of the second control switch 132. A first terminal of the second control switch 132 is electrically connected to a first electrode of the additional power supply 120. The first electrode is a positive electrode, and the second electrode is a negative electrode. Alternatively, the first electrode is a negative electrode, and the second electrode is a positive electrode.

When the battery unit 200 discharges into the battery formation apparatus 100, the first terminal of the first control switch 131 is not connected to the second terminal of the first control switch 131, and the first terminal of the second control switch 132 is connected to the second terminal of the second control switch 132. In other words, when the battery unit 200 discharges into the battery formation apparatus 100, the first control switch 131 is in an off state, and the second control switch 132 is in an on state, so that the battery unit 200, the low-voltage terminal 111 of the first DC-DC conversion module 110, and the additional power supply 120 are serially connected. In addition, the polarity of the additional power supply 120 is the same as the polarity of the battery unit 200, so that the additional power supply 120 and the battery unit 200 can output voltages of the same polarities.

Further optionally, when the battery unit 200 discharges into the battery formation apparatus 100 and the output voltage of the battery unit 200 is less than the first voltage threshold, the first control switch 131 is in an off state, and the second control switch 132 is in an on state.

Further optionally, when the battery formation apparatus 100 charges the battery unit 200 or the battery unit 200 discharges into the battery formation apparatus 100 and the output voltage of the battery unit 200 is greater than or equal to the first voltage threshold, the first control switch 131 is in an on state, and the second control switch 132 is in an off state, so that only the battery unit 200 and the low-voltage terminal 111 of the first DC-DC conversion module 110 are serially connected.

In the implementations of this embodiment, the charge and discharge assembly corresponds to the single battery unit, and the first control switch and the second control switch control connection of the additional power supply to a charge and discharge circuit, thereby further simplifying a structure of the battery formation apparatus and reducing formation costs.

In some embodiments, optionally, one charge and discharge assembly corresponds to a single battery unit. The control circuit 130 includes a first control switch 131 and a second control switch 132.

Figure 9:
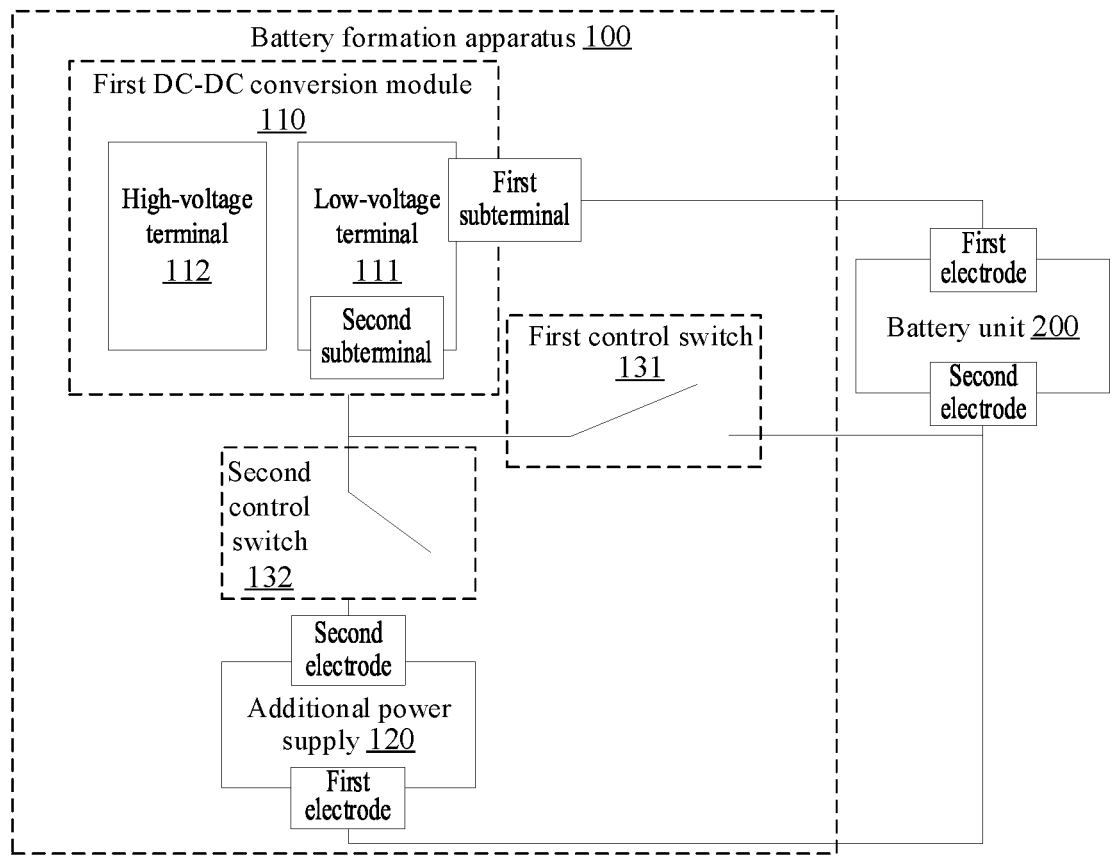
FIG. 9 is a schematic structural diagram of a battery formation apparatus according to some embodiments of the present application.

FIG. 9 is a schematic structural diagram of a battery formation apparatus according to some embodiments of the present application. As shown in FIG. 9, a first subterminal of the low-voltage terminal 111 of the first DC-DC conversion module 110 is electrically connected to a first electrode of the battery unit 200. A first terminal of the first control switch 131 is electrically connected to a second subterminal of the low-voltage terminal 111 of the first DC-DC conversion module 110 and a first terminal of the second control switch 132. A second terminal of the first control switch 131 is electrically connected to a second electrode of the battery unit 200 and a first electrode of the additional power supply 120. A second terminal of the second control switch 132 is electrically connected to a second electrode of the additional power supply 120. The first electrode is a positive electrode, and the second electrode is a negative electrode. Alternatively, the first electrode is a negative electrode, and the second electrode is a positive electrode.

When the battery unit 200 discharges into the battery formation apparatus 100, the first terminal of the first control switch 131 is not connected to the second terminal of the first control switch 131, and the first terminal of the second control switch 132 is connected to the second terminal of the second control switch 132. In other words, when the battery unit 200 discharges into the battery formation apparatus 100, the first control switch 131 is in an off state, and the second control switch 132 is in an on state, so that the battery unit 200, the low-voltage terminal 111 of the first DC-DC conversion module 110, and the additional power supply 120 are serially connected. In addition, the polarity of the additional power supply 120 is the same as the polarity of the battery unit 200, so that the additional power supply 120 and the battery unit 200 can output voltages of the same polarities.

Further optionally, when the battery unit 200 discharges into the battery formation apparatus 100 and the output voltage of the battery unit 200 is less than the first voltage threshold, the first control switch 131 is in an off state, and the second control switch 132 is in an on state.

Further optionally, when the battery formation apparatus 100 charges the battery unit 200 or the battery unit 200 discharges into the battery formation apparatus 100 and the output voltage of the battery unit 200 is greater than or equal to the first voltage threshold, the first control switch 131 is in an on state, and the second control switch 132 is in an off state, so that only the battery unit 200 and the low-voltage terminal 111 of the first DC-DC conversion module 110 are serially connected.

In the implementations of this embodiment, the charge and discharge assembly corresponds to the single battery unit, and the first control switch and the second control switch control connection of the additional power supply to a charge and discharge circuit, thereby further simplifying a structure of the battery formation apparatus and reducing formation costs.

In some embodiments, optionally, one charge and discharge assembly corresponds to a single battery unit. The control circuit 130 includes a third control switch 133.

Figure 10:
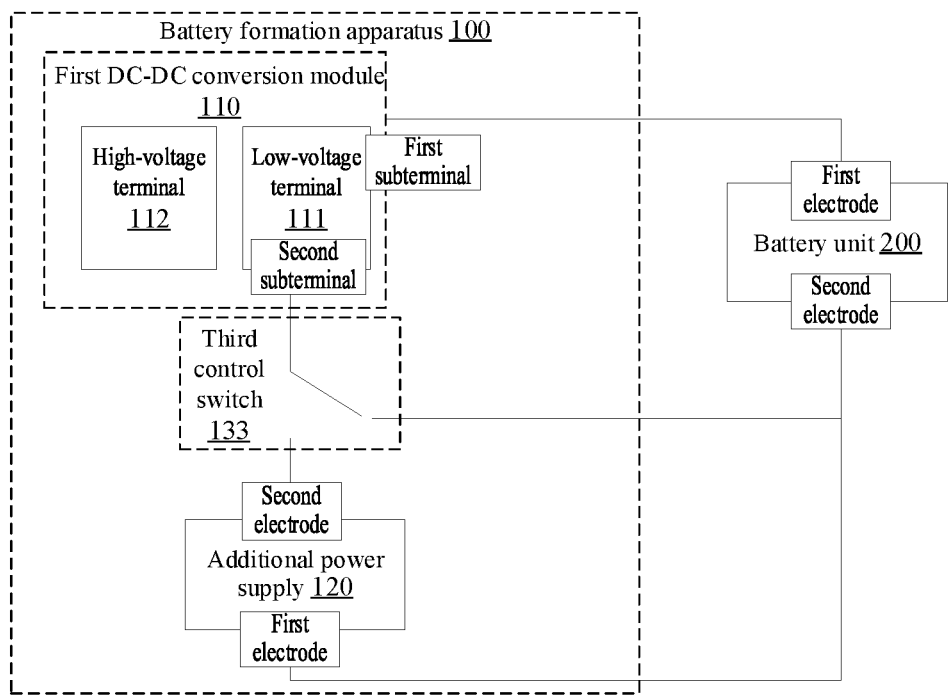
FIG. 10 is a schematic structural diagram of a battery formation apparatus according to some embodiments of the present application.

FIG. 10 is a schematic structural diagram of a battery formation apparatus according to some embodiments of the present application. As shown in FIG. 10, a first subterminal of the low-voltage terminal 111 of the first DC-DC conversion module 110 is electrically connected to a first electrode of the battery unit 200. A first terminal of the third control switch 133 is electrically connected to a second subterminal of the low-voltage terminal 111 of the first DC-DC conversion module 110. A second terminal of the third control switch is electrically connected to a second electrode of the battery unit 200 and a first electrode of the additional power supply 120. A third terminal of the third control switch 133 is electrically connected to a second electrode of the additional power supply. The first electrode is a positive electrode, and the second electrode is a negative electrode. Alternatively, the first electrode is a negative electrode, and the second electrode is a positive electrode.

When the battery unit 200 discharges into the battery formation apparatus 100, the first terminal of the third control switch 133 is not connected to the second terminal of the third control switch 133, and the first terminal of the third control switch 133 is connected to the third terminal of the third control switch 133.

In the implementations of this embodiment, the charge and discharge assembly corresponds to the single battery unit, and the third control switch may control connection of the additional power supply to a charge and discharge circuit, thereby further simplifying a structure of the battery formation apparatus, reducing a quantity of elements of the battery formation apparatus, and reducing formation costs.

In some embodiments, optionally, one charge and discharge assembly corresponds to a plurality of battery units. The plurality of battery units are specifically a first battery unit and a second battery unit. Quantities and connection manners of battery cells included in the first battery unit and the second battery unit may be the same or different. Formation processing is performed on a plurality of battery units by using one charge and discharge assembly, to effectively improve usage of the charge and discharge assembly and reduce energy consumption and costs of the battery formation apparatus.

In some embodiments, optionally, one charge and discharge assembly corresponds to a first battery unit and a second battery unit. The control circuit 130 includes a first control switch 131 and a second control switch 132.

Figure 11:
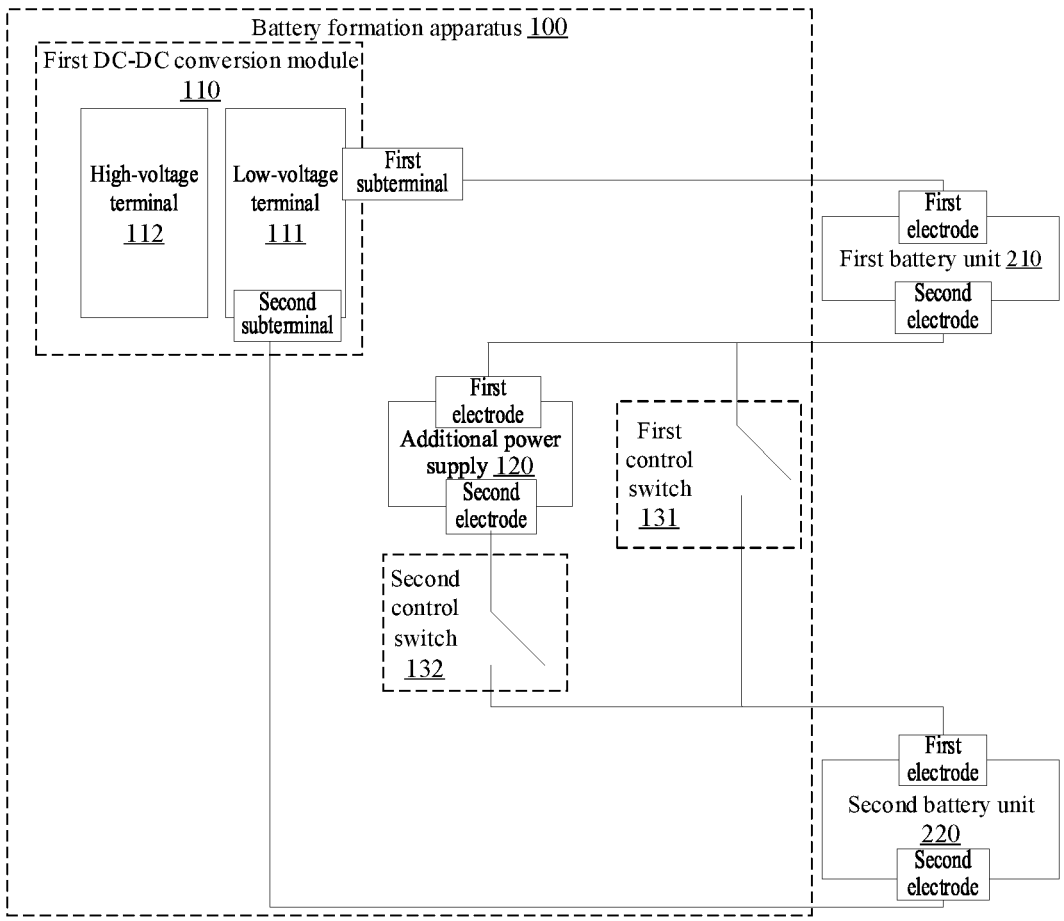
FIG. 11 is a schematic structural diagram of a battery formation apparatus according to some embodiments of the present application.

FIG. 11 is a schematic structural diagram of a battery formation apparatus according to some embodiments of the present application. As shown in FIG. 11, a first subterminal of the low-voltage terminal 111 of the first DC-DC conversion module 110 is electrically connected to a first electrode of the first battery unit 210. A second subterminal of the low-voltage terminal 111 of the first DC-DC conversion module 110 is electrically connected to a second electrode of the second battery unit 220. A first terminal of the first control switch 131 is electrically connected to a second electrode of the first battery unit 210 and a first electrode of the additional power supply 120. A second terminal of the first control switch 131 is electrically connected to a first electrode of the second battery unit 220 and a second terminal of the second control switch 132. A first terminal of the second control switch 132 is electrically connected to a second electrode of the additional power supply.

When the first battery unit 210 and/or the second battery unit 220 discharge/discharges into the battery formation apparatus 100, the first terminal of the first control switch 131 is not connected to the second terminal of the first control switch 131, and the first terminal of the second control switch 132 is connected to the second terminal of the second control switch 132, so that the first battery unit 210, the additional power supply 120, and the second battery unit 220 are serially connected. In addition, polarities of the first battery unit 210, the additional power supply 120, and the second battery unit 220 are the same. Voltages output by the first battery unit 210, the additional power supply 120, and the second battery unit 220 are superposed and then input to the low-voltage terminal of the first DC-DC conversion module 110.

Further optionally, when the first battery unit 210 and/or the second battery unit 220 discharge/discharges into the battery formation apparatus 100 and a sum of the output voltages of the first battery unit 210 and the second battery unit 220 is less than the first voltage threshold, the first control switch 131 is in an off state, and the second control switch 132 is in an on state.

Further optionally, when the battery formation apparatus 100 charges the first battery unit 210 and/or the second battery unit 220 or the first battery unit 210 and/or the second battery unit 220 discharge/discharges into the battery formation apparatus 100 and a sum of the output voltages of the first battery unit 210 and the second battery unit 220 is greater than or equal to the first voltage threshold, the first control switch 131 is in an on state, and the second control switch 132 is in an off state, so that only the first battery unit 210, the second battery unit 220, and the low-voltage terminal 111 of the first DC-DC conversion module 110 are serially connected.

In the implementations of this embodiment, the charge and discharge assembly corresponds to the first battery unit and the second battery unit, and the first control switch and the second control switch control connection of the additional power supply to a charge and discharge circuit, thereby simplifying a structure of the battery formation apparatus and reducing formation costs. In addition, the first control switch and the second control switch are disposed between the two battery units, thereby effectively shortening a connection wire and reducing costs of the battery formation apparatus.

In some embodiments, optionally, one charge and discharge assembly corresponds to a first battery unit and a second battery unit. The control circuit 130 includes a first control switch 131 and a second control switch 132.

Figure 12:
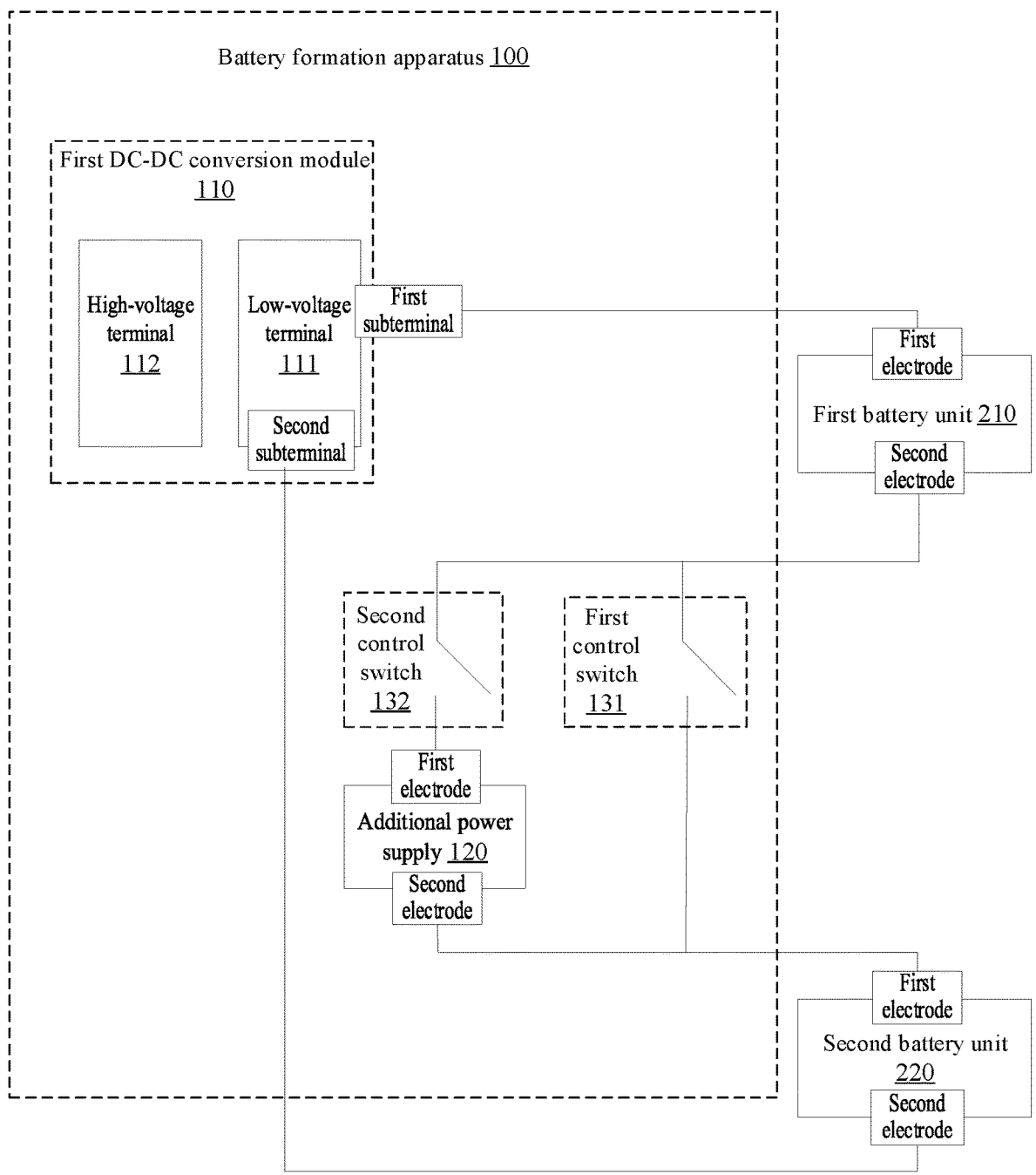
FIG. 12 is a schematic structural diagram of a battery formation apparatus according to some embodiments of the present application.

FIG. 12 is a schematic structural diagram of a battery formation apparatus according to some embodiments of the present application. As shown in FIG. 12, a first subterminal of the low-voltage terminal 111 of the first DC-DC conversion module 110 is electrically connected to a first electrode of the first battery unit 210. A second subterminal of the low-voltage terminal 111 of the first DC-DC conversion module 110 is electrically connected to a second electrode of the second battery unit 220. A first terminal of the first control switch 131 is electrically connected to a second electrode of the first battery unit 210 and a first terminal of the second control switch 132. A second terminal of the first control switch 131 is electrically connected to a second electrode of the additional power supply 120 and a first electrode of the second battery unit 220. A second terminal of the second control switch 132 is electrically connected to a first electrode of the additional power supply 120.

When the first battery unit 210 and/or the second battery unit 220 discharge/discharges into the battery formation apparatus 100, the first terminal of the first control switch 131 is not connected to the second terminal of the first control switch 131, and the first terminal of the second control switch 132 is connected to the second terminal of the second control switch 132. In other words, when the first battery unit 210 and/or the second battery unit 220 discharge/discharges into the battery formation apparatus 100, the first control switch 131 is in an off state, and the second control switch 132 is in an on state.

Further optionally, when the first battery unit 210 and/or the second battery unit 220 discharge/discharges into the battery formation apparatus 100 and a sum of the output voltages of the first battery unit 210 and the second battery unit 220 is less than the first voltage threshold, the first control switch 131 is in an off state, and the second control switch 132 is in an on state.

Further optionally, when the battery formation apparatus 100 charges the first battery unit 210 and/or the second battery unit 220 or the first battery unit 210 and/or the second battery unit 220 discharge/discharges into the battery formation apparatus 100 and a sum of the output voltages of the first battery unit 210 and the second battery unit 220 is greater than or equal to the first voltage threshold, the first control switch 131 is in an on state, and the second control switch 132 is in an off state, so that only the first battery unit 210, the second battery unit 220, and the low-voltage terminal 111 of the first DC-DC conversion module 110 are serially connected.

In the implementations of this embodiment, the charge and discharge assembly corresponds to the first battery unit and the second battery unit, and the first control switch and the second control switch control connection of the additional power supply to a charge and discharge circuit, thereby simplifying a structure of the battery formation apparatus and reducing formation costs. In addition, the first control switch and the second control switch are disposed between the two battery units, thereby effectively shortening a connection wire and reducing costs of the battery formation apparatus.

In some embodiments, optionally, one charge and discharge assembly corresponds to a first battery unit and a second battery unit. The control circuit 130 includes a third control switch 133.

Figure 13:
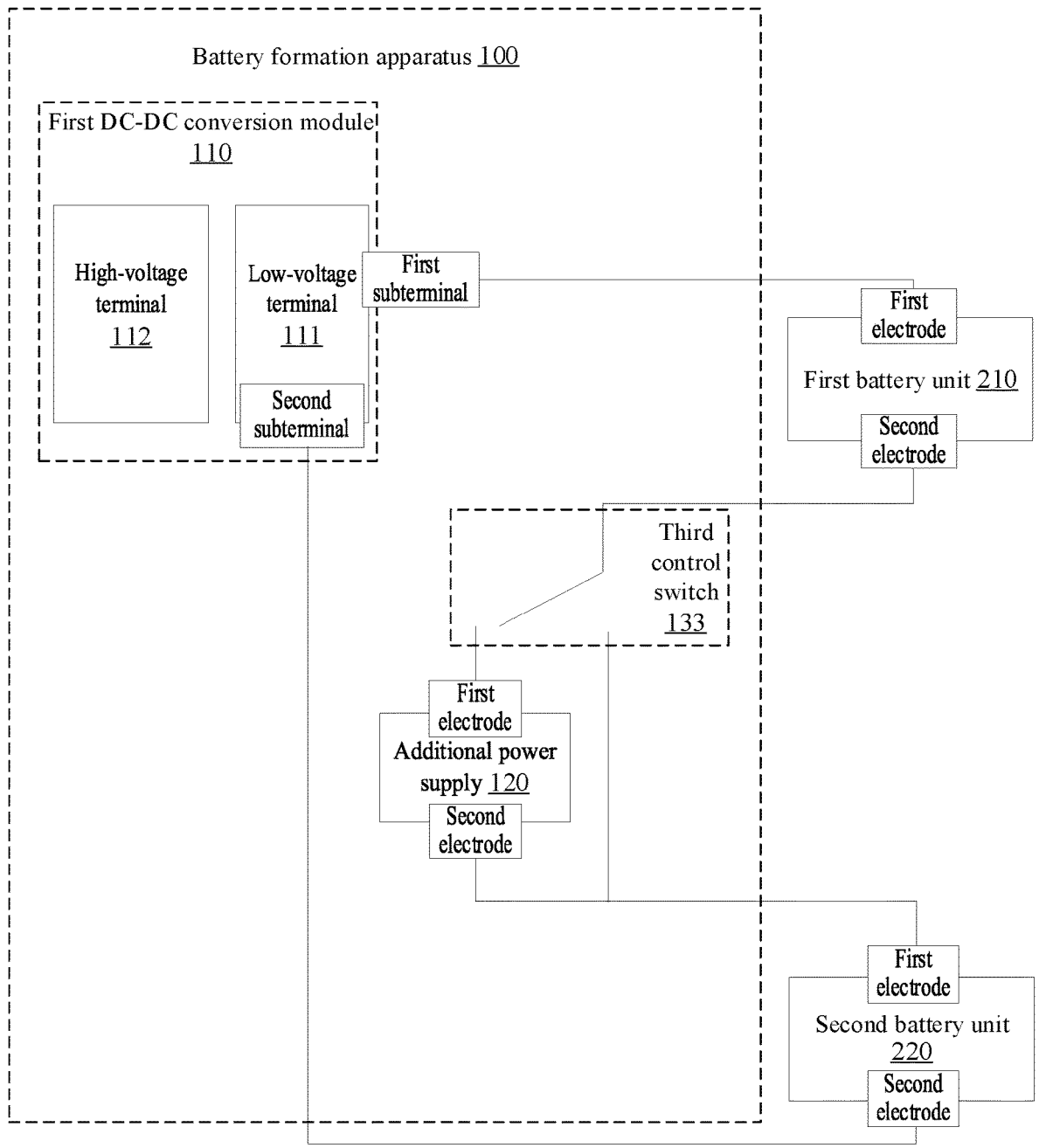
FIG. 13 is a schematic structural diagram of a battery formation apparatus according to some embodiments of the present application.

FIG. 13 is a schematic structural diagram of a battery formation apparatus according to some embodiments of the present application. As shown in FIG. 13, a first subterminal of the low-voltage terminal 111 of the first DC-DC conversion module 110 is electrically connected to a first electrode of the first battery unit 210. A second subterminal of the low-voltage terminal 111 of the first DC-DC conversion module 110 is electrically connected to a second electrode of the second battery unit 220. A first terminal of the third control switch 133 is electrically connected to a second electrode of the first battery unit 210. A second terminal of the third control switch 133 is electrically connected to a first electrode of the additional power supply 120. A third terminal of the third control switch 133 is electrically connected to a first electrode of the second battery unit 220.

When the first battery unit 210 and/or the second battery unit 220 discharge/discharges into the battery formation apparatus 100, the first terminal of the third control switch 133 is connected to the second terminal of the third control switch, so that the first battery unit 210, the additional power supply 120, and the second battery unit 220 are serially connected. In addition, polarities of voltages output by the first battery unit 210, the additional power supply 120, and the second battery unit 220 are consistent. The voltages output by the first battery unit 210, the additional power supply 120, and the second battery unit 220 are superposed and then input to the low-voltage terminal 111 of the first DC-DC conversion module 110.

Further optionally, when the first battery unit 210 and/or the second battery unit 220 discharge/discharges into the battery formation apparatus 100 and a sum of the output voltages of the first battery unit 210 and the second battery unit 220 is less than the first voltage threshold, the first terminal of the third control switch 133 is connected to the second terminal of the third control switch.

Further optionally, when the battery formation apparatus 100 charges the first battery unit 210 and/or the second battery unit 220 or the first battery unit 210 and/or the second battery unit 220 discharge/discharges into the battery formation apparatus 100 and a sum of the output voltages of the first battery unit 210 and the second battery unit 220 is greater than or equal to the first voltage threshold, the first terminal of the third control switch 133 is connected to the third terminal of the third control switch, so that the first battery unit 210, the second battery unit 220, and the low-voltage terminal 111 of the first DC-DC conversion module 110 are serially connected.

In the implementations of this embodiment, the charge and discharge assembly corresponds to the first battery unit and the second battery unit, and one control switch controls connection of the additional power supply to a charge and discharge circuit, thereby further reducing a quantity of elements of the battery formation apparatus and reducing formation costs. In addition, the third control switch is disposed between the two battery units, thereby effectively shortening a connection wire and reducing costs of the battery formation apparatus.

In some embodiments, optionally, the additional power supply is specifically a second DC-DC conversion module.

Figure 14:
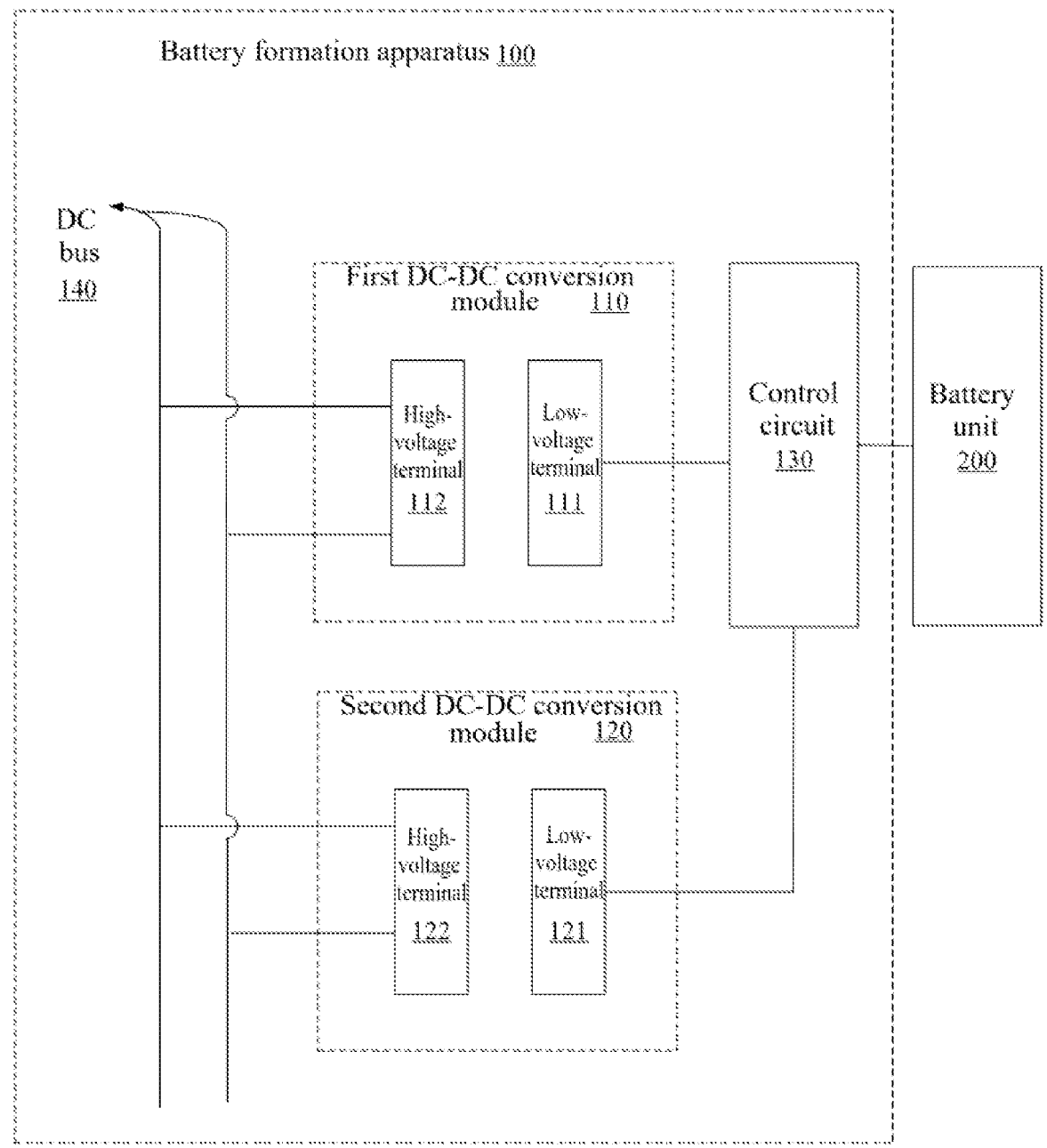
FIG. 14 is a schematic structural diagram of a battery formation apparatus according to some embodiments of the present application.

FIG. 14 is a schematic structural diagram of a battery formation apparatus according to some embodiments of the present application. As shown in FIG. 14, a high-voltage terminal 122 of the second DC-DC conversion module 120 is electrically connected to the DC bus 140. A low-voltage terminal 121 of the second DC-DC conversion module 120 is electrically connected to the control circuit 130.

When the battery unit 200 discharges into the battery formation apparatus 100, the control circuit 130 is configured to serially connect the low-voltage terminal 121 of the second DC-DC conversion module 120, the low-voltage terminal 111 of the first DC-DC conversion module, and the battery unit 200. In addition, when the battery unit 200 discharges into the battery formation apparatus 100, a polarity of a voltage output through the low-voltage terminal 121 of the second DC-DC conversion module 120 and a polarity of a voltage output by the battery unit are consistent, so that the voltage output through the low-voltage terminal 121 of the second DC-DC conversion module 120 and the voltage output by the battery unit are superposed and then input to the low-voltage terminal 111 of the first DC-DC conversion module, thereby increasing an input voltage of the first DC-DC conversion module and avoiding the defect that the input voltage of the first DC-DC conversion module is less than a minimum input voltage threshold of the first DC-DC conversion module.

In the implementations of this embodiment, the second DC-DC conversion module is used as the additional power supply. Therefore, when the battery unit discharges into the battery formation apparatus, the voltage output through the low-voltage terminal of the second DC-DC conversion module and the voltage output by the battery unit can be superposed and then input to the low-voltage terminal of the first DC-DC conversion module, thereby increasing the input voltage of the first DC-DC conversion module and avoiding the defect that the input voltage of the first DC-DC conversion module is less than the minimum input voltage threshold of the first DC-DC conversion module. In addition, the second DC-DC conversion module has low power consumption and a small size, thereby reducing energy consumption of the battery formation apparatus and reducing a size of the battery formation apparatus.

In some embodiments, optionally, the battery formation apparatus 100 further includes an AC-DC conversion module 160.

Figure 15:
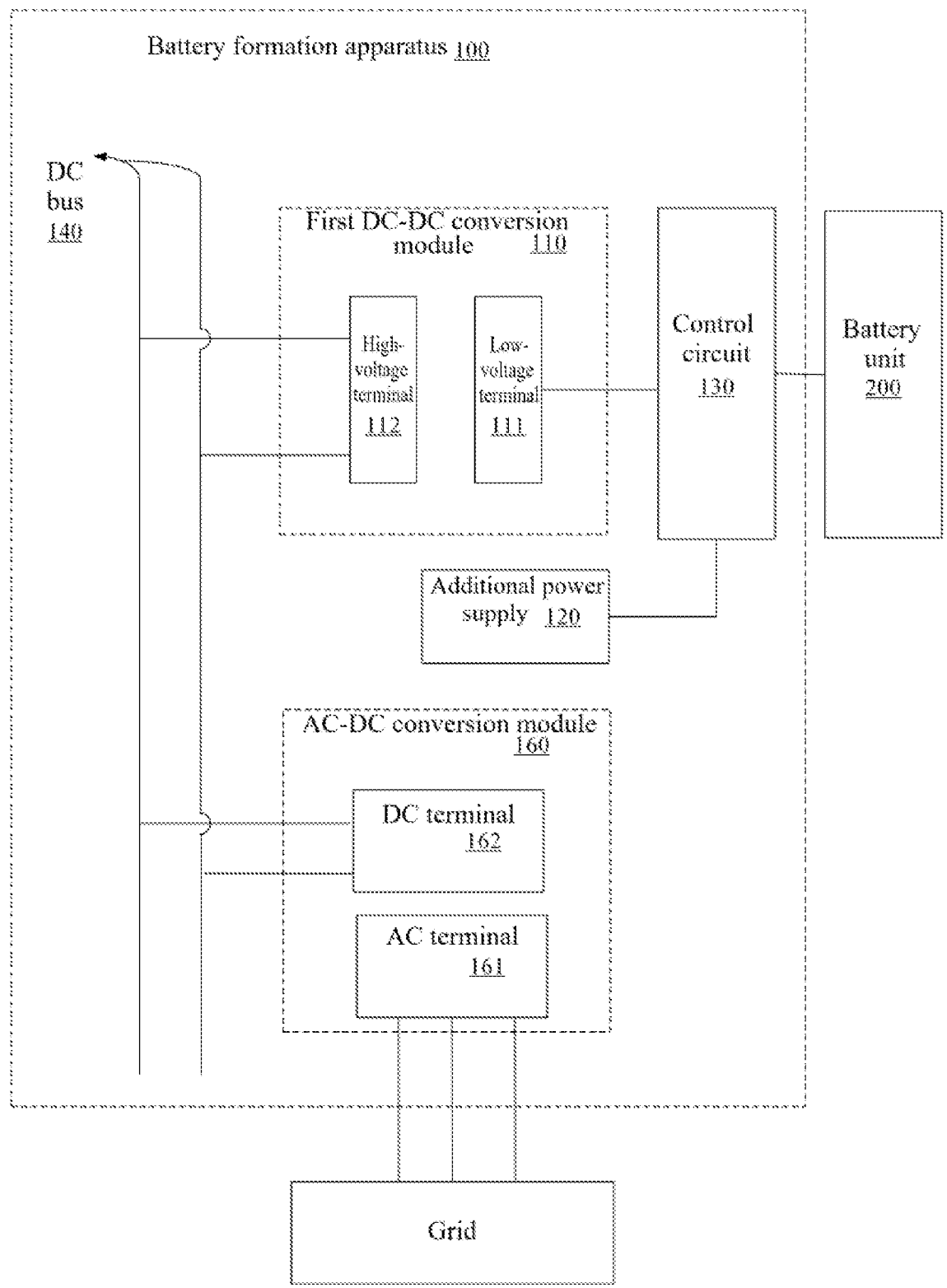
FIG. 15 is a schematic structural diagram of a battery formation apparatus according to some embodiments of the present application.

FIG. 15 is a schematic structural diagram of a battery formation apparatus according to some embodiments of the present application. As shown in FIG. 15, an AC terminal 161 of the AC-DC conversion module 160 is electrically connected to the grid. A DC terminal 162 of the AC-DC conversion module 160 is electrically connected to the DC bus 140.

The AC-DC conversion module 160 is configured to: when the battery unit 200 discharges into the battery formation apparatus 100, convert a DC voltage input through the DC terminal 162 of the AC-DC conversion module 160 into an AC voltage, and output the AC voltage to the grid through the AC terminal 161 of the AC-DC conversion module 160. The AC-DC conversion module 160 is configured to: when the battery unit 200 discharges into the battery formation apparatus 100, convert an AC voltage input through the AC terminal 161 of the AC-DC conversion module 160 into a DC voltage, and output the DC voltage to the DC bus through the DC terminal 162 of the AC-DC conversion module.

In the implementations of this embodiment, the AC-DC conversion module is disposed in the battery formation apparatus, so that an AC current of the grid can be converted into a DC current to charge the battery unit. A DC current output by the battery unit can also be converted into an AC current to be output to the grid. Therefore, the battery formation apparatus can be applicable to an AC current scenario, and a use range of the battery formation apparatus is enlarged.

In some embodiments, optionally, the battery formation apparatus 100 includes a first DC-DC conversion module 110, a second DC-DC conversion module 120, a first control switch 131, a second control switch 132, a DC bus 140, and an AC-DC conversion module 160.

Figure 16:
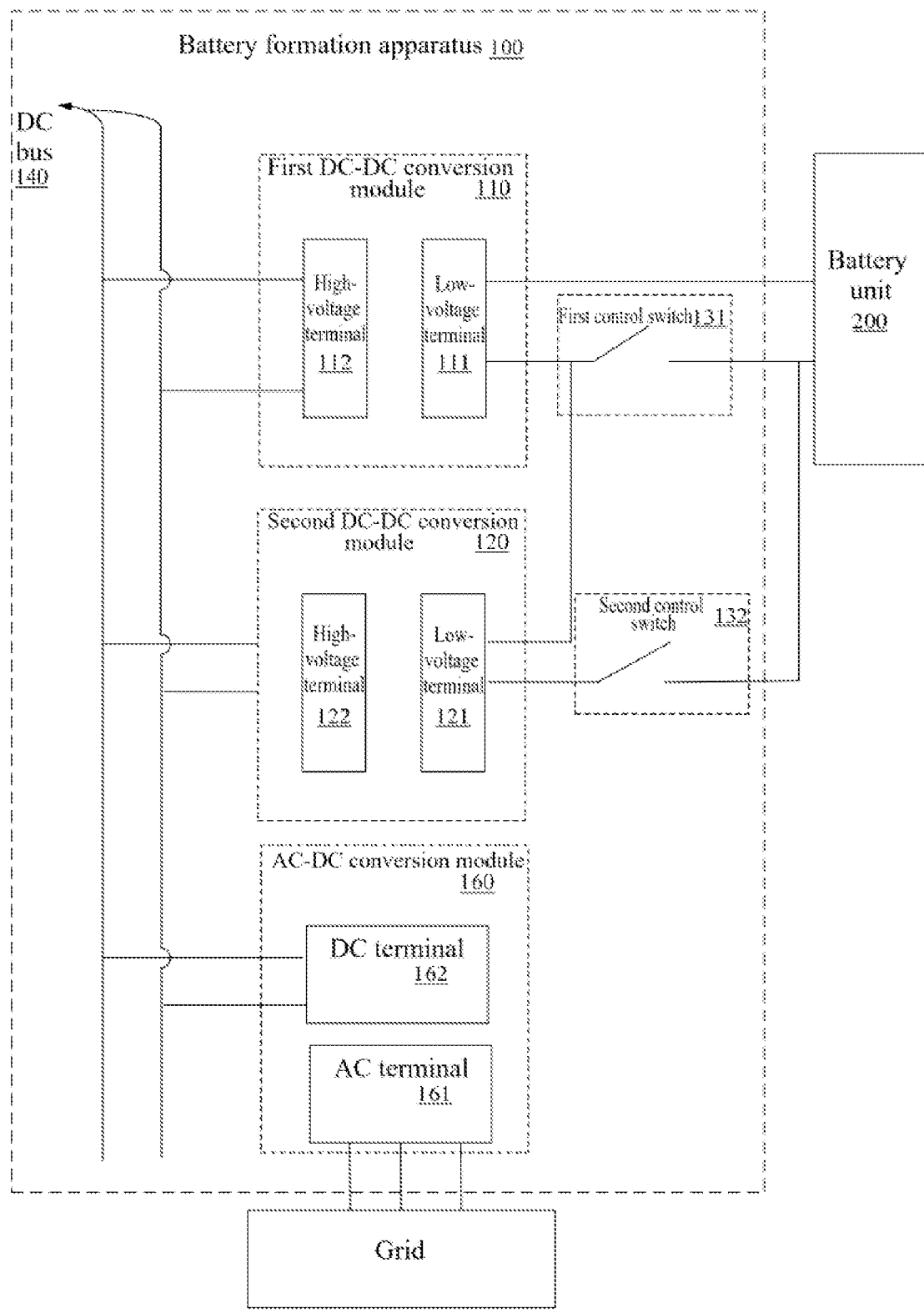
FIG. 16 is a schematic structural diagram of a battery formation apparatus according to some embodiments of the present application.

FIG. 16 is a schematic structural diagram of a battery formation apparatus according to some embodiments of the present application. As shown in FIG. 16, a first subterminal of the low-voltage terminal of the first DC-DC conversion module 110 is electrically connected to a first electrode of the battery unit. A second subterminal of the low-voltage terminal of the first DC-DC conversion module 110 is electrically connected to a first terminal of the first control switch and a first subterminal of the low-voltage terminal of the second DC-DC conversion module 120. A second subterminal of the low-voltage terminal of the second DC-DC conversion module 120 is electrically connected to a first terminal of the second control switch 132. A second terminal of the second control switch 132 is electrically connected to a second electrode of the battery unit 200. A second terminal of the first control switch 131 is electrically connected to the second electrode of the battery unit 200. A polarity of the low-voltage terminal of the second DC-DC conversion module 120 is consistent with a polarity of the battery unit. The high-voltage terminal 112 of the first DC-DC conversion module 110, the high-voltage terminal 122 of the second DC-DC conversion module 120, and the DC terminal 162 of the AC-DC conversion module 160 are electrically connected to the DC bus. The AC terminal 161 of the AC-DC conversion module 160 is electrically connected to the grid.

When the battery unit 200 discharges into the battery formation apparatus 100, if the voltage output by the battery unit 200 is less than the first voltage threshold, the first control switch 131 is switched off, and the second control switch 132 is switched on, so that the battery unit 200, the low-voltage terminal of the first DC-DC conversion module 110, and the low-voltage terminal of the second DC-DC conversion module 120 are serially connected. The low-voltage terminal of the first DC-DC conversion module 110 is a power consuming apparatus. The low-voltage terminal of the first DC-DC conversion module 110 is an input terminal. The low-voltage terminal of the second DC-DC conversion module 120 is a power supplying apparatus. The low-voltage terminal of the second DC-DC conversion module 120 is an output terminal. A polarity of the low-voltage terminal 121 of the second DC-DC conversion module 120 and a polarity of the battery unit 200 are consistent, so that the voltage output by the battery unit 200 and the voltage output through the low-voltage terminal 121 of the second DC-DC conversion module 120 are superposed and then input to the low-voltage terminal 111 of the first DC-DC conversion module 110, thereby increasing a voltage through the input terminal of the first DC-DC conversion module 110 and avoiding the defect that the voltage through the input terminal of the first DC-DC conversion module 110 is less than an input voltage limit of the first DC-DC conversion module 110. In addition, the first DC-DC conversion module increases the voltage input through the low-voltage terminal, and then outputs to the DC bus through the high-voltage terminal 112. The DC bus is connected to input the voltage to the DC terminal 162 of the AC-DC conversion module 160. The AC-DC conversion module 160 converts a DC current into an AC current, and then transmits to the grid through the AC terminal 161. A capacity detection device connected to the grid can obtain capacity information of the battery unit.

When the battery formation apparatus 100 charges the battery unit 200 or the battery unit 200 discharges into the battery formation apparatus 100 and the voltage output by the battery unit 200 is greater than or equal to the first voltage threshold, the first control switch 131 is switched on, and the second control switch 132 is switched off, so that the battery unit 200 and the first DC-DC conversion module 110 are serially connected. The AC-DC conversion module 160 converts an AC voltage of the grid into a DC voltage, and then outputs to the DC bus. The DC bus then transmits the voltage to the high-voltage terminal 112 of the first DC-DC conversion module 110. After the voltage is decreased, a voltage is output through the low-voltage terminal 111. The output voltage is used to charge the battery unit.

Figure 17:
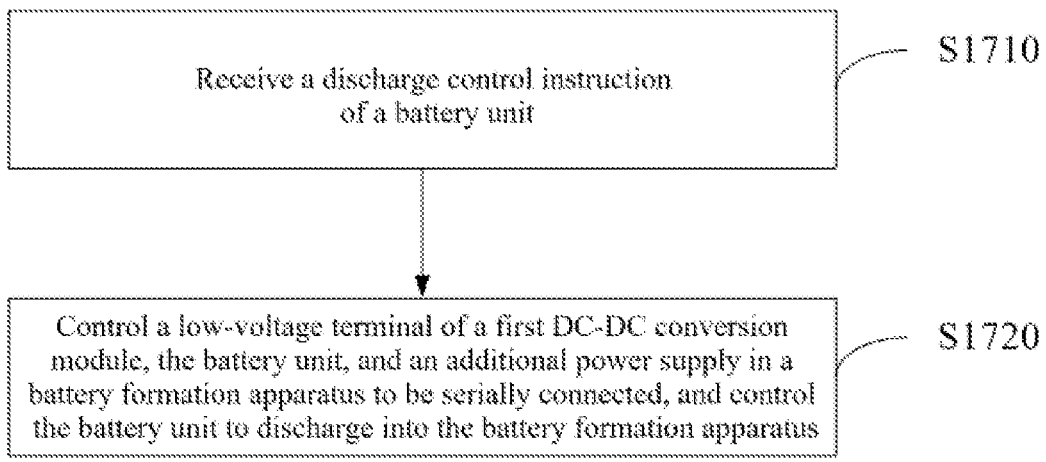
FIG. 17 is a schematic flowchart of a control method for a battery formation apparatus according to some embodiments of the present application.

According to some embodiments of the present application, reference is made to FIG. 17. FIG. 17 is a schematic flowchart of a control method for a battery formation apparatus according to some embodiments of the present application.

As shown in FIG. 17, the control method includes the following steps.

Step S1710: Receive a discharge control instruction of a battery unit.

A battery formation apparatus may receive a control instruction from an intermediary computer. The control instruction may be specifically a discharge control instruction and a charge control instruction. The discharge control instruction is used to allow the battery unit to discharge into the battery formation apparatus. The charge control instruction is used to allow the battery formation apparatus to charge the battery unit.

Optionally, charge mode information sent by the intermediary computer may be further received. The charge mode information specifically indicates a charge mode of the battery unit. The charge mode may be a constant current mode or a constant voltage mode.

Optionally, a charge or discharge time limit parameter sent by the intermediary computer may be further received. The time limit parameter indicates a charge or discharge time range of the battery unit.

Optionally, a current accuracy parameter sent by the intermediary computer may be further received. The current accuracy parameter indicates an accuracy range of a current in a charge or discharge process.

Step S1720: Control a low-voltage terminal of a first DC-DC conversion module, the battery unit, and an additional power supply in a battery formation apparatus to be serially connected, and control the battery unit to discharge into the battery formation apparatus.

After receiving the discharge control instruction, the battery formation apparatus controls the low-voltage terminal of the first DC-DC conversion module, the battery unit, and the additional power supply in the battery formation apparatus to be serially connected, and controls the battery unit to discharge into the battery formation apparatus.

In the implementations of this embodiment, in a timely response to the discharge control instruction issued by the intermediary computer, the additional power supply can be serially connected to a discharge circuit formed with the low-voltage terminal of the first DC-DC conversion module and the battery unit, thereby increasing a voltage input to the low-voltage terminal of the first DC-DC conversion module and avoiding that the voltage input to the low-voltage terminal of the first DC-DC conversion module is less than a minimum input voltage threshold of the first DC-DC conversion module. Therefore, each battery cell of the battery unit can sufficiently discharge, thereby avoiding the technical defects of a poor formation effect of the battery unit and poor accuracy of a detected battery capacity that are caused when each battery cell of the battery unit cannot sufficiently discharge.

In some embodiments, optionally, the method further includes: detecting an output voltage of the battery unit, and controlling the low-voltage terminal of the first DC-DC conversion module, the battery unit, and the additional power supply in the battery formation apparatus to be serially connected if it is detected that the output voltage of the battery unit is less than a first voltage threshold.

In the implementations of this embodiment, when the battery unit is in a discharge state and the output voltage of the battery unit is less than the first voltage threshold, the additional power supply is turned on. The additional power supply is serially connected to the discharge circuit formed with the low-voltage terminal of the first DC-DC conversion module and the battery unit, thereby further reducing overall energy consumption of the battery formation apparatus and reducing formation processing costs of the battery formation apparatus.

In some embodiments, optionally, the method further includes: if it is detected that the output voltage of the battery unit is less than the first voltage threshold, after stopping an AC-DC conversion module in the battery formation apparatus, controlling the low-voltage terminal of the first DC-DC conversion module, the battery unit, and the additional power supply in the battery formation apparatus to be serially connected; and after controlling the low-voltage terminal of the first DC-DC conversion module, the battery unit, and the additional power supply in the battery formation apparatus to be serially connected, restarting the AC-DC conversion module.

In the implementations of this embodiment, when it is determined that the additional power supply needs to be connected, if the additional power supply is directly serially connected to the discharge circuit formed with the low-voltage terminal of the first DC-DC conversion module and the battery unit, a transient peak voltage occurs in the first DC-DC conversion module, affecting a service life of the first DC-DC conversion module. In this embodiment, the AC-DC conversion module is first stopped, to avoid that the AC-DC conversion module continuously outputs a high voltage to the first DC-DC conversion module through a DC bus. Then, the additional power supply is serially connected to the discharge circuit formed with the low-voltage terminal of the first DC-DC conversion module and the battery unit, thereby avoiding a transient peak voltage in the first DC-DC conversion module and prolonging a service life of the first DC-DC conversion module.

In some embodiments, optionally, the method further includes: collecting battery state information of the battery unit, and feeding the battery state information back to the intermediary computer.

The battery state information may specifically include at least one of the following pieces of information: a plate temperature, a currently executed control instruction, a charge and discharge mode, and an actual current value.

In the implementations of this embodiment, the battery state information of the battery unit is collected in real time and fed back, so that a state of the battery unit during formation is learned of in a timely manner, an abnormal state is learned of in a timely manner, and a timely response is made to the abnormal state.

In some embodiments, optionally, the method further includes: determining whether charging duration for which the battery formation apparatus charges the battery unit exceeds preset duration; if the charging duration exceeds the preset duration, sending alarm information to the intermediary computer; and receiving a stop instruction sent by the intermediary computer based on the alarm information, and stopping the AC-DC conversion module in the battery formation apparatus.

When the charging duration for which the battery formation apparatus charges the battery unit exceeds the preset duration, it indicates that charging time of the battery unit has already exceeded limit time of a formation process. However, a battery level of the battery unit does not meet a requirement yet, it indicates a current fault mode, and the alarm information is sent to the intermediary computer in a timely manner. The intermediary computer issues, based on the alarm information, the instruction for stopping an output of the AC-DC conversion module, to stop the output of the AC-DC conversion module.

In the implementations of this embodiment, whether an anomaly exists in the battery unit is determined based on the charging duration of the battery unit. If it is determined that an anomaly exists in the battery unit, the alarm information is sent to the intermediary computer in the timely manner, so that the anomaly of the battery unit is handled with. In addition, during processing, the output of the AC-DC conversion module is stopped, thereby protecting safety of the battery unit and the battery formation apparatus and also reducing energy consumption of the battery formation apparatus and reducing formation costs.

In some embodiments, optionally, the method further includes: determining whether an output voltage of the battery unit exceeds a second voltage threshold; if the output voltage of the battery unit exceeds the second voltage threshold, sending alarm information to the intermediary computer; and receiving a stop instruction sent by the intermediary computer based on the alarm information, and stopping an output of the battery unit according to the stop instruction.

When the battery unit charges the battery formation apparatus, if it is detected that the output voltage of the battery unit exceeds the second voltage threshold, it indicates a current abnormal state, and the alarm information is fed back to the intermediary computer in a timely manner. The output of the battery unit is stopped in a timely manner according to the stop instruction sent by the intermediary computer.

In the implementations of this embodiment, whether an anomaly exists is determined based on a discharge voltage of the battery unit. If it is determined that an anomaly exists, the alarm information is sent to the intermediary computer in the timely manner, so that the anomaly is handled with. In addition, during processing, the output of the battery unit is stopped, thereby protecting safety of the battery unit and the battery formation apparatus and also reducing energy consumption of the battery unit and reducing formation costs.

Figure 18:
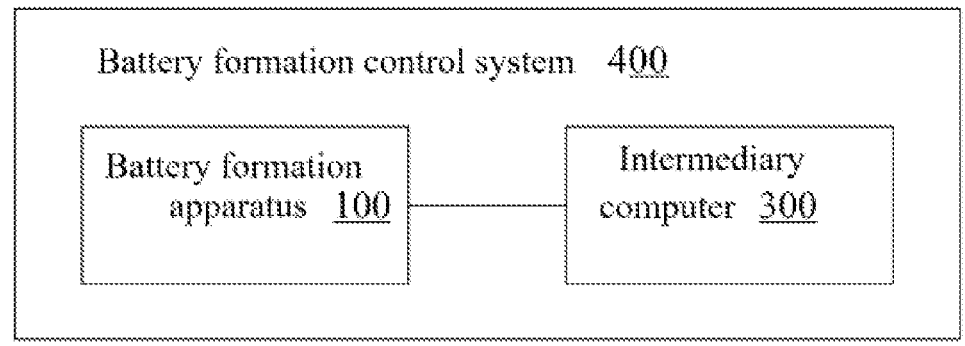
FIG. 18 is a schematic structural diagram of a battery formation control system according to some embodiments of the present application.

According to some embodiments of the present application, reference is made to FIG. 18. FIG. 18 is a schematic structural diagram of a battery formation control system according to some embodiments of the present application.

As shown in FIG. 18, the battery formation control system 400 includes a battery formation apparatus 100 and an intermediary computer 300. The intermediary computer 300 is communicatively connected to the battery formation apparatus 100.

The intermediary computer 300 is configured to send a charge control instruction or a discharge control instruction to the battery formation apparatus 100.

The battery formation apparatus 100 is configured to control, according to the discharge control instruction, the battery unit 200 to discharge into the battery formation apparatus 100; or the battery formation apparatus 100 is configured to control, according to the charge control instruction, the battery formation apparatus 100 to charge the battery unit 200.

For a specific structure and an implementation process of the battery formation apparatus 100, reference may be made to descriptions of corresponding parts in other embodiments. Details are not described herein.

Finally, it should be noted that the above embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A battery formation apparatus, comprising:
   a DC-DC conversion module;
   an additional power supply; and
   a control circuit;
   wherein:
   a low-voltage terminal of the DC-DC conversion module is electrically connected to the control circuit, and a high-voltage terminal of the DC-DC conversion module is electrically connected to a DC bus;
   the DC-DC conversion module is configured to, in response to a battery unit discharging into the battery formation apparatus, convert a first voltage input through the low-voltage terminal into a second voltage, and output the second voltage through the high-voltage terminal, the second voltage being greater than the first voltage;
   the additional power supply is electrically connected to the control circuit, and the additional power supply is configured to output an additional voltage, a polarity of the additional power supply being consistent with a polarity of the battery unit; and
   the control circuit is electrically connected to the battery unit, the low-voltage terminal of the DC-DC conversion module, and the additional power supply, and the control circuit is configured to serially connect the low-voltage terminal of the DC-DC conversion module, the battery unit, and the additional power supply in response to the battery unit discharging into the battery formation apparatus.

2. The apparatus according to claim 1, wherein the control circuit is further configured to serially connect the low-voltage terminal of the DC-DC conversion module and the battery unit in response to the battery formation apparatus charging the battery unit.

3. The apparatus according to claim 1, further comprising:
   a detection module, wherein the detection module is electrically connected to the battery unit and the control circuit, and the detection module is configured to detect an output voltage of the battery unit; and
   the control circuit is further configured to serially connect the low-voltage terminal of the DC-DC conversion module, the battery unit, and the additional power supply in response to the battery unit discharging into the battery formation apparatus and the detection module detecting that the output voltage of the battery unit is less than a voltage threshold.

4. The apparatus according to claim 1, wherein:
   the control circuit comprises a first control switch and a second control switch;
   a first subterminal of the low-voltage terminal of the DC-DC conversion module is electrically connected to a first electrode of the battery unit;
   a first terminal of the first control switch is electrically connected to a second subterminal of the low-voltage terminal of the DC-DC conversion module and a second electrode of the additional power supply, and a second terminal of the first control switch is electrically connected to a second electrode of the battery unit and a second terminal of the second control switch;
   a first terminal of the second control switch is electrically connected to a first electrode of the additional power supply; and
   when the battery unit discharges into the battery formation apparatus, the first terminal of the first control switch is not connected to the second terminal of the first control switch, and the first terminal of the second control switch is connected to the second terminal of the second control switch.

5. The apparatus according to claim 1, wherein:
   the control circuit comprises a first control switch and a second control switch;
   a first subterminal of the low-voltage terminal of the DC-DC conversion module is electrically connected to a first electrode of the battery unit;
   a first terminal of the first control switch is electrically connected to a second subterminal of the low-voltage terminal of the DC-DC conversion module and a first terminal of the second control switch, and a second terminal of the first control switch is electrically connected to a second electrode of the battery unit and a first electrode of the additional power supply;
   a second terminal of the second control switch is electrically connected to a second electrode of the additional power supply; and
   when the battery unit discharges into the battery formation apparatus, the first terminal of the first control switch is not connected to the second terminal of the first control switch, and the first terminal of the second control switch is connected to the second terminal of the second control switch.

6. The apparatus according to claim 1, wherein:
   the control circuit comprises a control switch;
   a first subterminal of the low-voltage terminal of the DC-DC conversion module is electrically connected to a first electrode of the battery unit;
   a first terminal of the control switch is electrically connected to a second subterminal of the low-voltage terminal of the DC-DC conversion module, a second terminal of the control switch is electrically connected to a second electrode of the battery unit and a first electrode of the additional power supply, and a third terminal of the control switch is electrically connected to a second electrode of the additional power supply; and
   when the battery unit discharges into the battery formation apparatus, the first terminal of the control switch is not connected to the second terminal of the control switch, and the first terminal of the control switch is connected to the third terminal of the control switch.

7. The apparatus according to claim 1, wherein the battery unit is one of a first battery unit and a second battery unit.

8. The apparatus according to claim 7, wherein:
   the control circuit comprises a first control switch and a second control switch;
   a first subterminal of the low-voltage terminal of the DC-DC conversion module is electrically connected to a first electrode of the first battery unit, and a second subterminal of the low-voltage terminal of the DC-DC conversion module is electrically connected to a second electrode of the second battery unit;
   a first terminal of the first control switch is electrically connected to a second electrode of the first battery unit and a first electrode of the additional power supply, and a second terminal of the first control switch is electrically connected to a first electrode of the second battery unit and a second terminal of the second control switch;
   a first terminal of the second control switch is electrically connected to a second electrode of the additional power supply; and when the battery unit discharges into the battery formation apparatus, the first terminal of the first control switch is not connected to the second terminal of the first control switch, and the first terminal of the second control switch is connected to the second terminal of the second control switch.

9. The apparatus according to claim 7, wherein:
the control circuit comprises a first control switch and a second control switch;
a first subterminal of the low-voltage terminal of the DC-DC conversion module is electrically connected to a first electrode of the first battery unit, and a second subterminal of the low-voltage terminal of the DC-DC conversion module is electrically connected to a second electrode of the second battery unit;
a first terminal of the first control switch is electrically connected to a second electrode of the first battery unit and a first terminal of the second control switch, and a second terminal of the first control switch is electrically connected to a second electrode of the additional power supply and a first electrode of the second battery unit;
a second terminal of the second control switch is electrically connected to a first electrode of the additional power supply; and
when the battery unit discharges into the battery formation apparatus, the first terminal of the first control switch is not connected to the second terminal of the first control switch, and the first terminal of the second control switch is connected to the second terminal of the second control switch.

10. The apparatus according to claim 7, wherein:
the control circuit comprises a control switch;
a first subterminal of the low-voltage terminal of the DC-DC conversion module is electrically connected to a first electrode of the first battery unit, and a second subterminal of the low-voltage terminal of the DC-DC conversion module is electrically connected to a second electrode of the second battery unit;
a first terminal of the control switch is electrically connected to a second electrode of the first battery unit, a second terminal of the control switch is electrically connected to a first electrode of the additional power supply, and a third terminal of the control switch is electrically connected to a first electrode of the second battery unit; and
when the battery unit discharges into the battery formation apparatus, the first terminal of the control switch is connected to the second terminal of the control switch.

11. The apparatus according to claim 1, wherein:
the DC-DC conversion module is a first DC-DC conversion module;
the additional power supply includes a second DC-DC conversion module; and
a high-voltage terminal of the second DC-DC conversion module is electrically connected to the DC bus, and a low-voltage terminal of the second DC-DC conversion module is serially connected to the low-voltage terminal of the first DC-DC conversion module and the battery unit in response to the battery unit discharging into the battery formation apparatus.

12. The apparatus according to claim 1, further comprising:
an AC-DC conversion module;
wherein:
an AC terminal of the AC-DC conversion module is electrically connected to a power grid, and a DC terminal of the AC-DC conversion module is electrically connected to the DC bus; and
the AC-DC conversion module is configured to:
in response to the battery unit discharging into the battery formation apparatus, convert a DC voltage input through the DC terminal of the AC-DC conversion module into an AC voltage, and output the AC voltage through the AC terminal of the AC-DC conversion module; and
in response to the battery formation apparatus charging the battery unit, convert an AC voltage input through the AC terminal of the AC-DC conversion module into a DC voltage, and output the DC voltage through the DC terminal of the AC-DC conversion module.

13. A control method for the battery formation apparatus according to claim 1, comprising:
receiving a discharge control instruction of the battery unit;
controlling the low-voltage terminal of the DC-DC conversion module, the battery unit, and the additional power supply of the battery formation apparatus to be serially connected; and
controlling the battery unit to discharge into the battery formation apparatus.

14. The method according to claim 13, wherein controlling the low-voltage terminal of the DC-DC conversion module, the battery unit, and the additional power supply of the battery formation apparatus to be serially connected comprises:
detecting an output voltage of the battery unit; and
controlling the low-voltage terminal of the DC-DC conversion module, the battery unit, and the additional power supply of the battery formation apparatus to be serially connected in response to detecting that the output voltage of the battery unit is less than a voltage threshold.

15. The method according to claim 14, wherein controlling the low-voltage terminal of the DC-DC conversion module, the battery unit, and the additional power supply of the battery formation apparatus to be serially connected in response to detecting that the output voltage of the battery unit is less than the voltage threshold comprises:
in response to detecting that the output voltage of the battery unit is less than the voltage threshold, after stopping an AC-DC conversion module of the battery formation apparatus, controlling the low-voltage terminal of the DC-DC conversion module, the battery unit, and the additional power supply of the battery formation apparatus to be serially connected; and
after controlling the low-voltage terminal of the DC-DC conversion module, the battery unit, and the additional power supply of the battery formation apparatus to be serially connected, restarting the AC-DC conversion module.

16. The method according to claim 13, further comprising:
collecting battery state information of the battery unit; and
feeding the battery state information back to an intermediary computer.

17. The method according to claim 13, further comprising:
determining whether charging duration for which the battery formation apparatus charges the battery unit exceeds preset duration; and
in response to the charging duration exceeding the preset duration:

sending alarm information to an intermediary computer;
receiving a stop instruction sent by the intermediary computer based on the alarm information; and
stopping the AC-DC conversion module of the battery formation apparatus.

18. The method according to claim 13, further comprising:
determining whether an output voltage of the battery unit exceeds a voltage threshold; and
in response to the output voltage of the battery unit exceeding the voltage threshold:
sending alarm information to an intermediary computer;
receiving a stop instruction sent by the intermediary computer based on the alarm information; and
stopping an output of the battery unit according to the stop instruction.

19. A battery formation control system, comprising:
a battery formation apparatus comprising:
a DC-DC conversion module;
an additional power supply; and
a control circuit;
wherein:
a low-voltage terminal of the DC-DC conversion module is electrically connected to the control circuit, and a high-voltage terminal of the DC-DC conversion module is electrically connected to a DC bus;
the DC-DC conversion module is configured to, in response to a battery unit discharging into the battery formation apparatus, convert a first voltage input through the low-voltage terminal into a second voltage, and output the second voltage through the high-voltage terminal, the second voltage being greater than the first voltage;
the additional power supply is electrically connected to the control circuit, and the additional power supply is configured to output an additional voltage, a polarity of the additional power supply being consistent with a polarity of the battery unit; and
the control circuit is electrically connected to the battery unit, the low-voltage terminal of the first DC-DC conversion module, and the additional power supply, and the control circuit is configured to serially connect the low-voltage terminal of the DC-DC conversion module, the battery unit, and the additional power supply in response to the battery unit discharging into the battery formation apparatus; and
an intermediary computer, wherein the intermediary computer is communicatively connected to the battery formation apparatus;
wherein:
the intermediary computer is configured to send a charge control instruction or a discharge control instruction to the battery formation apparatus; and
the battery formation apparatus is configured to:
control the battery unit to discharge into the battery formation apparatus according to the discharge control instruction; or
control the battery formation apparatus to charge the battery unit according to the charge control instruction.

* * * * *